United States Patent
Bi et al.

(10) Patent No.: US 12,210,791 B2
(45) Date of Patent: Jan. 28, 2025

(54) MULTI-SCREEN MANAGEMENT

(71) Applicant: Microsoft Technology Licensing, LLC, Redmond, WA (US)

(72) Inventors: Ran Bi, Beijing (CN); Wei Yang, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/547,327

(22) PCT Filed: Mar. 8, 2022

(86) PCT No.: PCT/US2022/019216
§ 371 (c)(1),
(2) Date: Aug. 21, 2023

(87) PCT Pub. No.: WO2022/211983
PCT Pub. Date: Oct. 6, 2022

(65) Prior Publication Data
US 2024/0264789 A1    Aug. 8, 2024

(30) Foreign Application Priority Data
Mar. 30, 2021   (CN) .......................... 202110340609.3

(51) Int. Cl.
*G06F 3/14*      (2006.01)
*G06F 3/0482*    (2013.01)

(52) U.S. Cl.
CPC .......... *G06F 3/1423* (2013.01); *G06F 3/0482* (2013.01); *G06F 3/1454* (2013.01)

(58) Field of Classification Search
CPC ..... G06F 3/1423; G06F 3/0482; G06F 3/1454
See application file for complete search history.

(56) References Cited

U.S. PATENT DOCUMENTS 9,240,127 B2   1/2016 Wong et al.
11,178,528 B2 *  11/2021 Chen .................... H04W 76/30
(Continued)

FOREIGN PATENT DOCUMENTS

| CN | 101238715 A | 8/2008 |
|---|---|---|
| CN | 201118742 Y | 9/2008 |

(Continued)

OTHER PUBLICATIONS

"Logitech Harmony Smart Control", Retrieved From: https://web.archive.org/web/20170830071704/https:/www.logitech.com/assets/50381/harmony-smart-control-user-guide.pdf, Aug. 30, 2017, 43 Pages.

(Continued)

*Primary Examiner* — Sardis F Azongha

(74) *Attorney, Agent, or Firm* — Schwegman Lundberg & Woessner, P.A.

(57) ABSTRACT

The present disclosure provides methods and apparatuses for multi-screen management. In some implementations, a plurality of connection requests may be received from a plurality of screen devices respectively. A screen host unit corresponding to each screen device may be created. A connection of each screen host unit to a corresponding screen device may be established. Screen display data may be transmitted, by at least one screen host unit, to at least one corresponding screen device through at least one corresponding connection respectively. Moreover, in some implementations, a connection request may be transmitted to a screen management hub. A connection to a corresponding screen host unit created by the screen management hub may (Continued)

be established. Screen display data may be received from the screen host unit through the connection. The screen display data may be displayed.

14 Claims, 10 Drawing Sheets

(56) References Cited

U.S. PATENT DOCUMENTS

| | | | |
|---|---|---|---|
| 12,039,144 B2 * | 7/2024 | Yi | ............................ G06F 9/452 |
| 2007/0232342 A1 | 10/2007 | Larocca | |
| 2009/0254854 A1 | 10/2009 | Adams | |
| 2012/0092277 A1 | 4/2012 | Momchilov | |
| 2015/0350320 A1 | 12/2015 | Yang | |
| 2017/0109519 A1 | 4/2017 | Sugaya | |
| 2017/0220307 A1 | 8/2017 | Da Silva Ramos et al. | |
| 2021/0183336 A1 * | 6/2021 | Hassan | ................... G06F 1/165 |

FOREIGN PATENT DOCUMENTS

| | | |
|---|---|---|
| CN | 104570751 A | 4/2015 |
| CN | 106775526 A | 5/2017 |
| CN | 110908625 A | 3/2020 |
| CN | 112328197 A | 2/2021 |
| DE | 102007052813 B3 | 1/2009 |
| WO | WO-2022211983 A1 | 10/2022 |

OTHER PUBLICATIONS

"Play Media on Multiple Google Nest Devices", Retrieved From: https://support.google.com/chromecast/answer/10012636?hl=en, Feb. 24, 2021, 2 Pages.

Myers, et al., "Extending the Windows Desktop Interface With Connected Handheld Computers", In Proceedings of the 4th Conference on USENIX Windows Systems Symposium, vol. 4, Aug. 3, 2000, 10 Pages.

Nadel, Brian, "11 Screen-Mirroring Devices for Presenting Wirelessly", Retrieved From: https://www.computerworld.com/article/3604480/11-screen-mirroring-devices-for-presenting-wirelessly.html?page=2, Jan. 28, 2021, 9 Pages.

"International Application No. PCT/US2022/019216, International Search Report mailed Jun. 27, 2022", (Jun. 27, 2022), 3 pgs.

"International Application No. PCT/US2022/019216, Written Opinion of the International Search Authority dated Jun. 27, 2022", (Jun. 27, 2022), 6 pgs.

First Office Action Received for Chinese Application No. 202110340609.3, mailed on Apr. 30, 2024, 13 pages.(English Translation Provided).

Second Office Action Received for Chinese Application No. 202110340609.3, mailed on Nov. 11, 2024, 11 pages. (English Translation Provided).

* cited by examiner

MULTI-SCREEN MANAGEMENT

PRIORITY CLAIM TO RELATED APPLICATIONS

This application is a U.S. national stage filing under 35 U.S.C. § 371 from International Application No. PCT/US2022/019216, filed on Mar. 8, 2022, and published as WO2022/211983 on Oct. 6, 2022, which claims the benefit under 35 U.S.C. 119 to Chinese Application No. 202110340609.3, filed on Mar. 30, 2021, the benefit of priority of each of which is claimed herein, and which applications and publication are hereby incorporated herein by reference in their entirety.

BACKGROUND

Nowadays, more and more electronic devices with screens are used in people's daily life, e.g., desktop monitors, notebook computers, tablet computers, mobile phones, smart TVs, projectors, electronic photo frames, electronic screens, etc. Herein, these electronic devices with screens may be collectively referred to as screen devices. Some types of screen devices only provide basic display functions, e.g., electronic screens. Other types of screen devices have high processing capability or intelligence level, e.g., mobile phones, tablet computers, smart TVs, etc., which are usually installed with specific intelligent operating systems, e.g., Windows system, Android system, iOS system, etc. Screen devices of different types or installed with different operating systems usually operate independently from each other.

SUMMARY

This Summary is provided to introduce a selection of concepts that are further described below in the Detailed Description. It is not intended to identify key features or essential features of the claimed subject matter, nor is it intended to be used to limit the scope of the claimed subject matter.

Embodiments of the present disclosure propose methods and apparatuses for multi-screen management. In some implementations, a plurality of connection requests may be received from a plurality of screen devices respectively. A screen host unit corresponding to each screen device may be created. A connection of each screen host unit to a corresponding screen device may be established. Screen display data may be transmitted, by at least one screen host unit, to at least one corresponding screen device through at least one corresponding connection respectively. Moreover, in some implementations, a connection request may be transmitted to a screen management hub. A connection to a corresponding screen host unit created by the screen management hub may be established. Screen display data may be received from the screen host unit through the connection. The screen display data may be displayed.

It should be noted that the above one or more aspects comprise the features hereinafter fully described and particularly pointed out in the claims. The following description and the drawings set forth in detail certain illustrative features of the one or more aspects. These features are only indicative of the various ways in which the principles of various aspects may be employed, and this disclosure is intended to include all such aspects and their equivalents.

BRIEF DESCRIPTION OF THE DRAWINGS

The disclosed aspects will hereinafter be described in conjunction with the appended drawings that are provided to illustrate and not to limit the disclosed aspects.

DETAILED DESCRIPTION

Figure 1:
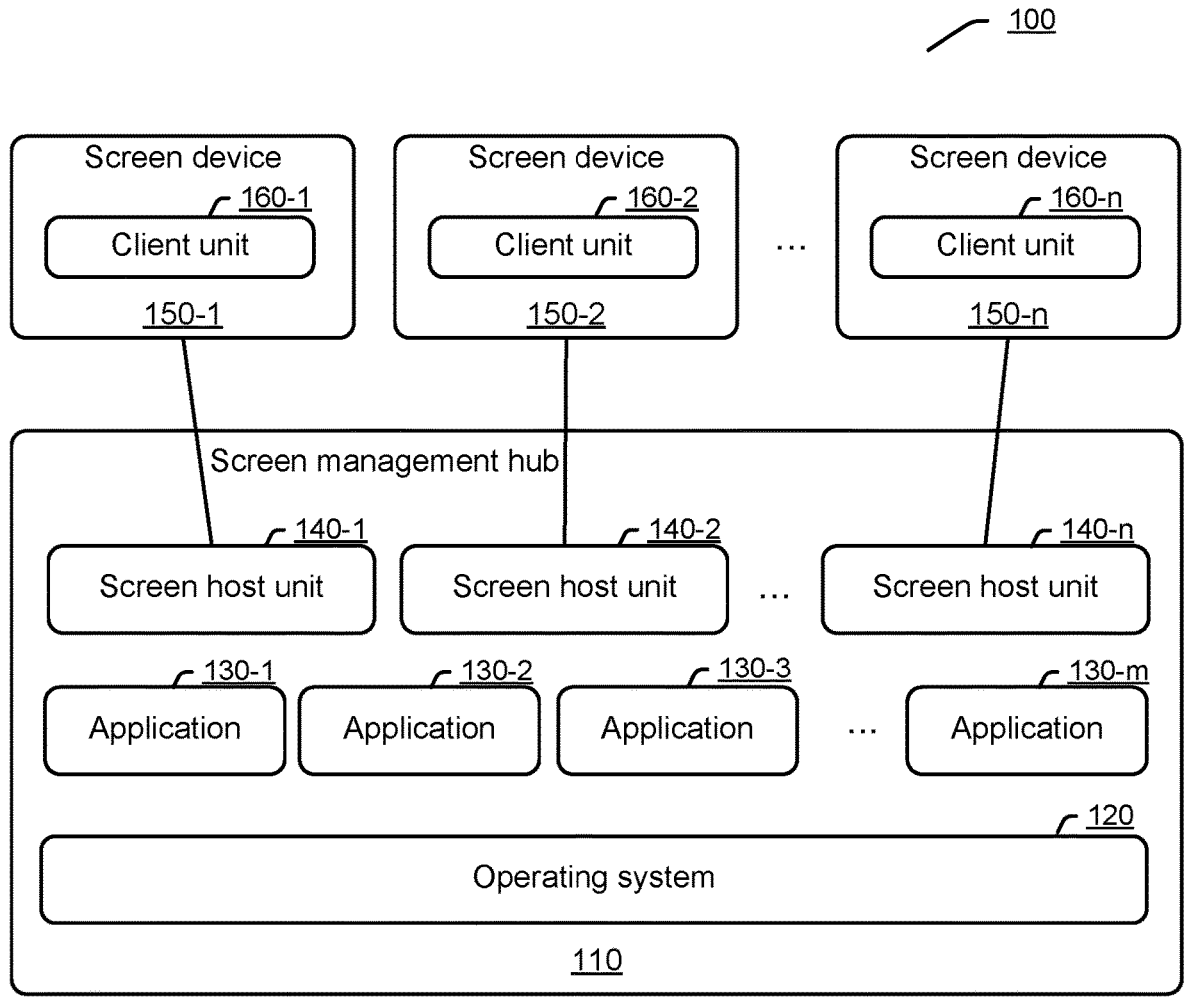
FIG. 1 illustrates multi-screen management architecture according to an embodiment.
Figure 1:
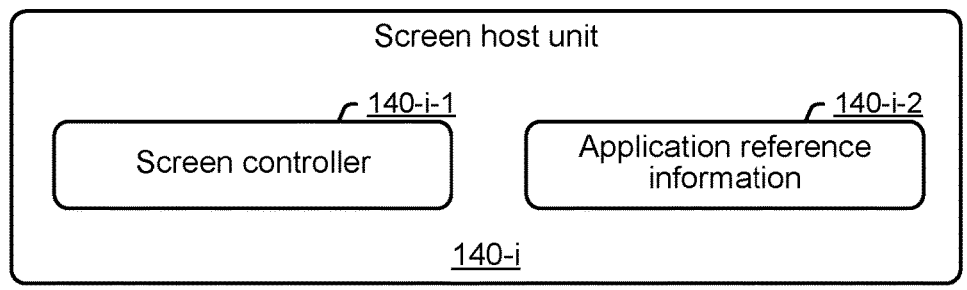

The present disclosure will now be discussed with reference to several example implementations. It is to be understood that these implementations are discussed only for enabling those skilled in the art to better understand and thus implement the embodiments of the present disclosure, rather than suggesting any limitations on the scope of the present disclosure.

Since existing screen devices usually operate independently from each other, even if a plurality of screen devices are geographically located in the same area or connected to the same network, it is difficult to conveniently and collaboratively manage content displayed on these screen devices. If a user desires to display the same content on the plurality of screen devices or needs to change content respectively displayed on the plurality of screen devices, the user needs to perform a series of operations on each screen device respectively. Moreover, even if the user performs a series of operations, it may be difficult or impossible to display specific content on each screen device. As an example, when a user is watching a TV program on a smart TV in the living room, if the user walks to the bedroom or study room, even if there are a plurality of other screen devices in the bedroom or study room, e.g., electronic photo frames, laptops, etc., it is difficult or impossible for the user to continue watching the TV program on said other screen devices. Some screen projection technologies for projecting content displayed on a screen device to another screen device have been proposed, e.g., Digital Living Network Alliance (DLNA), Mirror Casting (Miracast), etc. However, these screen projection technologies usually adopt a one-to-one or end-to-end mode, and are often restricted by proprietary applications or standards, operating system compatibility, etc. Moreover, these screen projection technologies can neither realize freely switching of projections among a plurality of screen devices, nor effectively manage content display on the plurality of screen devices.

Embodiments of the present disclosure propose an efficient and flexible multi-screen management scheme. A screen management hub is deployed to interconnect with a plurality of screen devices and is used for managing a plurality of screen devices in a centralized approach.

The screen management hub may be a smart device having certain processing capability and installed with an operating system. The screen management hub may create a screen host unit for each connected screen device, so as to implement system-level screen device management through screen host units. Each screen host unit may be, e.g., a routine, thread, program, etc. which is associated with a system desktop instance and loaded into the memory, wherein the system desktop instance may correspond to a shell of the operating system. Accordingly, a plurality of screen host units in the screen management hub may be associated with a plurality of system desktop instances respectively. Thus, each screen host unit may be used for implementing independent display, application access, user interaction, etc. at a corresponding screen device. For example, by applying a screen host unit, a user may independently access the operating system of the screen management hub at various screen devices.

In an aspect, the screen management hub may comprise one or more applications. A user may access these applications from a plurality of screen devices. At the screen management hub, these applications are accessed through screen host units corresponding to respective screen devices, rather than being accessed directly. This will facilitate to perform centralized management to the plurality of screen devices through the plurality of screen host units at the screen management hub.

In an aspect, a screen device may obtain screen display data from the screen management hub for display. In this case, the screen device may be a screen device that only provides basic display functions, or a screen device with high processing capability or intelligence level. Herein, screen display data may broadly refer to various contents that can be displayed on a screen device, e.g., home screen, image frames of an application, etc.

In an aspect, when a screen device has high processing capability or intelligence level, the screen device may provide screen display data to the screen management hub, so that the screen display data may be further displayed on other screen devices.

In an aspect, a screen device may comprise a client unit that interacts with a corresponding screen host unit in the screen management hub, for performing indication transmission, screen display data transmission, etc. between the screen device and the screen host unit.

According to the embodiments of the present disclosure, through the plurality of screen host units corresponding to the plurality of screen devices in the screen management hub, various types of management to the plurality of screen devices may be implemented efficiently and flexibly. Accordingly, a user may flexibly perform various controls to the plurality of screen devices. For example, contents may be displayed independently on different screen devices, the same content may be displayed synchronously on different screen devices, other screen devices may be controlled on a screen device to launch a target application, content displayed on a screen device may be shared to other screen devices, content being displayed on another screen device may be displayed on a screen device, screen display on another screen device may be shut down on a screen device, etc.

FIG. 1 illustrates multi-screen management architecture 100 according to an embodiment. In the architecture 100, a screen management hub 110 and a plurality of screen devices may be in the same network environment, e.g., connected to the same local area network.

The screen management hub 110 may be a dedicated device for implementing multi-screen management according to the embodiments of the present disclosure, or may reside in a specific smart device, or reside in a specific screen device with high processing capability or intelligence level. Although not shown, the screen management hub 110 may comprise any necessary hardware components according to specific implementations, e.g., at least one of a processor, a memory, a display, a user input/output (I/O) device, a network adapter, etc.

The screen management hub 110 may be installed with an operating system 120. It should be understood that the embodiments of the present disclosure are not limited to any specific type of operating system. For example, the operating system 120 may be based on a Windows system, an Android system, an iOS system, or any other operating systems. In an implementation, the operating system 120 may be an improvement of a traditional operating system for implementing the operating mechanism adapted to the multi-screen management according to the embodiments of the present disclosure. For example, unlike a traditional operating system that supports direct access to applications, the operating system 120 treats applications installed on it as internal applications, so that access to these applications needs to be implemented via screen host units.

As an example, a plurality of applications are installed in the operating system 120, e.g., an application 130-1, an application 130-2, an application 130-3, . . . , an application 130-$m$, etc. Herein, an application may broadly refer to software, program, widget, etc. The plurality of applications may comprise applications of various uses and types, e.g., a media player, social software, a picture viewer, etc. The embodiments of the present disclosure are neither limited to any specific applications, nor limited to specific approaches in which these applications are installed in the operating system 120. For example, one or more of the plurality of applications may be pre-installed in the operating system 120, may be installed by an operator himself/herself of the screen management hub, etc.

According to the embodiments of the present disclosure, the screen management hub 110 may create a plurality of screen host units for a plurality of screen devices, e.g., a screen host unit 140-1 corresponding to a screen device 150-1, a screen host unit 140-2 corresponding to a screen device 150-2, . . . , a screen host unit 140-*n* corresponding to a screen device 150-*n*, etc. These screen host units may act as a bridge between the screen management hub 110 and corresponding screen devices to manage the plurality of screen devices. A screen host unit may perform various interactions with a corresponding screen device, e.g., receiving various requests or indications from the screen device, establishing a connection with the screen device, transmitting screen display data to the screen device, receiving screen display data from the screen device, etc. Moreover, the plurality of screen host units may also interact with each other, e.g., transmitting notifications, screen display data, etc. to each other.

Taking a screen host unit 140-*i* as an example, a screen host unit 140-*i* may comprise a screen host controller 140-*i*-1. The screen controller 140-*i*-1 provides specific processing capabilities of the screen host unit 140-*i*, e.g., interaction capability with the corresponding screen device, interaction capability with other screen host units, control capability related to multi-screen management, etc. Moreover, the screen host unit 140-*i* may also comprise or maintain application reference information 140-*i*-2. The application reference information 140-*i*-2 is a reference to a target application displayed on the screen device, e.g., it may point to a storage location of the target application in the memory, etc. The screen host unit may transmit image frames of the target application to the corresponding screen device based at least on the application reference information. For example, the screen controller 140-*i*-1 in the screen host unit 140-*i* may find the target application based at least on the application reference information 140-*i*-2, so that image frames of the target application may be provided to the screen device.

A screen device may comprise a client unit which is used for interacting with a corresponding screen host unit in the screen management hub, e.g., being used for indication transmission, screen display data transmission, etc. between the screen device and the screen host unit. As an example, the screen device 150-1 may comprise a client unit 160-1 interacting with the corresponding screen host unit 140-1, the screen device 150-2 may comprise a client unit 160-2 interacting with the corresponding screen host unit 140-2, . . . , the screen device 150-*n* may comprise a client unit 160-*n* interacting with the corresponding screen host unit 140-*n*, etc. A client unit may be a software or hardware module pre-installed in a screen device or installed by an operator himself/herself of a screen device. Although not shown, a screen device may comprise any necessary hardware components according to specific implementations, e.g., at least one of a processor, a memory, a display, a user input/output (I/O) device, a network adapter, a speaker, a microphone, etc. A screen device may at least support interacting with a user through various types of user interfaces. For example, a screen device may support at least one of a user interface which is based on touch input, a user interface which is based on voice input, a user interface which is based on key input, a user interface which is based on mouse input, or any other user interfaces, for receiving user operations. The screen devices 150-1, 150-2, . . . , 150-*n*, etc. may comprise various types of screen devices, e.g., screen devices that only provide basic display functions (such as, electronic screens, etc.), screen devices with high processing capability or intelligence level (such as, mobile phone, etc.), etc.

It should be understood that all the elements shown in the architecture 100 are exemplary, and the architecture 100 may be changed in any approaches according to specific application scenarios and requirements. For example, although the screen management hub 110 is shown as an independent device, the screen management hub 110 may also reside in a specific smart device or a specific screen device. In this case, the operating system of the specific smart device or the specific screen device may be improved based on the operating mechanism of the screen management hub 110 shown in FIG. 1. Moreover, although multiple parts in the above and following discussion exemplarily involve that a screen management hub and a plurality of screen devices are in the same network environment, e.g., connected to the same local area network, the embodiments of the present disclosure are not limited to this connection approach, but may cover any other connection approaches among a screen management hub and a plurality of screen devices. For example, a screen management hub and a plurality of screen devices may communicate with each other via different local area networks, may communicate with each other via different types of networks such as a WIFI network, a mobile network, etc., may communicate with each other via wired connections and wireless connections, etc.

Figure 2:
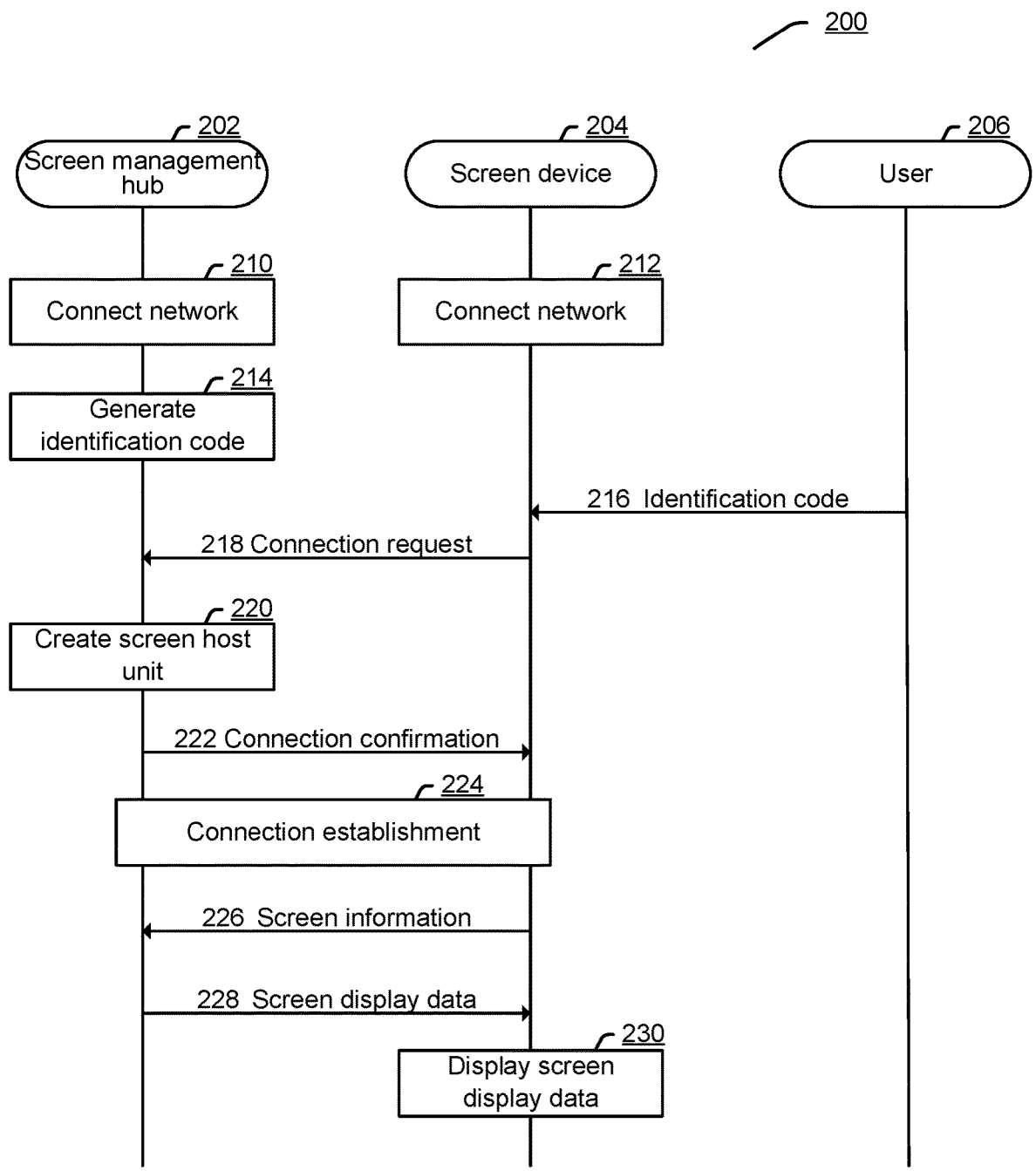
FIG. 2 illustrates an exemplary process for multi-screen management according to an embodiment.

FIG. 2 illustrates an exemplary process 200 for multi-screen management according to an embodiment. Through the process 200, a screen management hub may connect with a screen device and transmit screen display data to the screen device, so that the screen device may display the screen display data to a user.

A screen management hub 202 may be connected to a network at 210, e.g., a specific local area network. An exemplary screen device 204 may be connected to a network at 212, e.g., a network which is the same as the network to which the screen management hub 202 is connected. The screen device 204 may be any one of the plurality of screen devices shown in FIG. 1.

The screen management hub 202 may generate an identification code corresponding to the screen management hub 202 at 214.

At 216, the screen device 204 may receive an identification code input by a user 206, which indicates a screen management hub that the user 206 desires to connect to. As described above, depending on the types of user interfaces supported by the screen device 204, the user 206 may input the identification code through various approaches e.g., touch input, voice input, etc.

Assuming that the identification code input by the user 206 is the same as the identification code generated by the screen management hub 202, the screen device 204 may transmit a connection request to the screen management hub 202 at 218, to indicate that it desires to connect to the screen management hub 202. For example, the connection request may be transmitted by a client unit in the screen device 204 to the screen management hub 202. Optionally, the connection request may further comprise an identifier for identifying the screen device 204, etc.

After the screen management hub 202 receives the connection request from the screen device 204, the screen management hub 202 may create a screen host unit corresponding to the screen device 204 at 220. Optionally, in the case that a history record of the screen management hub 202 includes historical information of the screen device 204, if the screen management hub 202 identifies the screen device 204 according to an identifier of screen device in the connection request, the screen management hub 202 may create the screen host unit at step 220 in consideration of at least the historical information of the screen device 204. The historical information of the screen device 204 may comprise, e.g., parameter information, configuration preferences, etc., adopted when the screen device 204 was previously connected to the screen management hub 202. The created screen host unit may be initialized with at least the historical information of the screen device, so that the historical information may be considered in the subsequent steps of, e.g., transmitting screen display data.

At 222, the screen management hub 202 may transmit a connection confirmation to the screen device 204 to indicate that it has accepted the connection request of the screen device 204. For example, the connection confirmation may be transmitted to the screen device 204 by the screen host unit created at 220. In an implementation, the screen host unit may comprise a screen controller, and accordingly, the connection confirmation may be transmitted by the screen controller to the client unit of the screen device 202.

At 224, a connection is established between the screen management hub 202 and the screen device 204. Through the established connection, the screen host unit, or more specifically, the screen controller in the screen host unit, may communicate with the client unit in the screen device 204.

Optionally, at 226, the screen device 204 may transmit screen information to the screen management hub 202, wherein the screen information may comprise various types of parameter information about the screen device 204, e.g., screen size, resolution, user interface type, configuration preference, etc. For example, the screen information may be transmitted by the client unit in the screen device 204 to the screen controller in the screen host unit.

At 228, the screen host unit may transmit screen display data to the screen device 204 through the established connection. For example, the screen controller in the screen host unit may transmit the screen display data to the client unit in the screen device 204 through the established connection. In the case that the screen host unit received the screen information at 226, the screen host unit may determine a specific format of the screen display data that is suitable for displaying on the screen device 204, based at least on the screen information. Moreover, in the case that the screen host unit was created in consideration of at least the historical information of the screen device 204, the screen host unit may also determine a specific format of the screen display data that is suitable for displaying on the screen device 204, based at least on parameter information, configuration preference, etc. included in the historical information of the screen device 204.

At 230, the screen device 204 may display the received screen display data. For example, after the client unit in the screen device 204 receives the screen display data, an electronic screen of the screen device 204 may visually present the screen display data.

It should be understood that all the steps in the above process 200 are exemplary, and the process 200 may be modified in any approaches according to specific application scenarios and requirements. For example, the above steps 216, 218, 222, etc. may be regarded as a processing of mutual discovery or authentication between the screen management hub 202 and the screen device 204, but the process 200 may also comprise any other steps for the discovery or authentication processing. For example, all or a part of the steps in the process 200 may be included in a predefined protocol, and thus the screen management hub and the screen device may implement multi-screen management by complying with the protocol. However, the embodiments of the present disclosure are not limited to implementing the process 200 in an approach of protocol. Moreover, the step 228 of transmitting the screen display data from the screen host unit to the screen device in the process 200 is only exemplary, and in different application scenarios, this step may comprise more details or have more related processing steps, as discussed below with reference to FIG. 3 to FIG. 12. Further, the step 228 may be performed continuously or repeatedly, thus implementing that the screen host unit continuously transmits screen display data to the screen device. Moreover, although the process 200 only involves one screen device 204, it should be understood that the process 200 may also be similarly performed for any other screen devices, so that the screen management hub 202 may receive connection requests from a plurality of screen devices, create screen host units respectively corresponding to the plurality of screen devices, establish a connection between each screen host unit and a corresponding screen device, transmit screen display data to a corresponding screen device through a screen host unit, etc. Moreover, the user shown in FIG. 2 and the users involved in the following may broadly refer to, e.g., the same one user, different users, etc.

Figure 3:
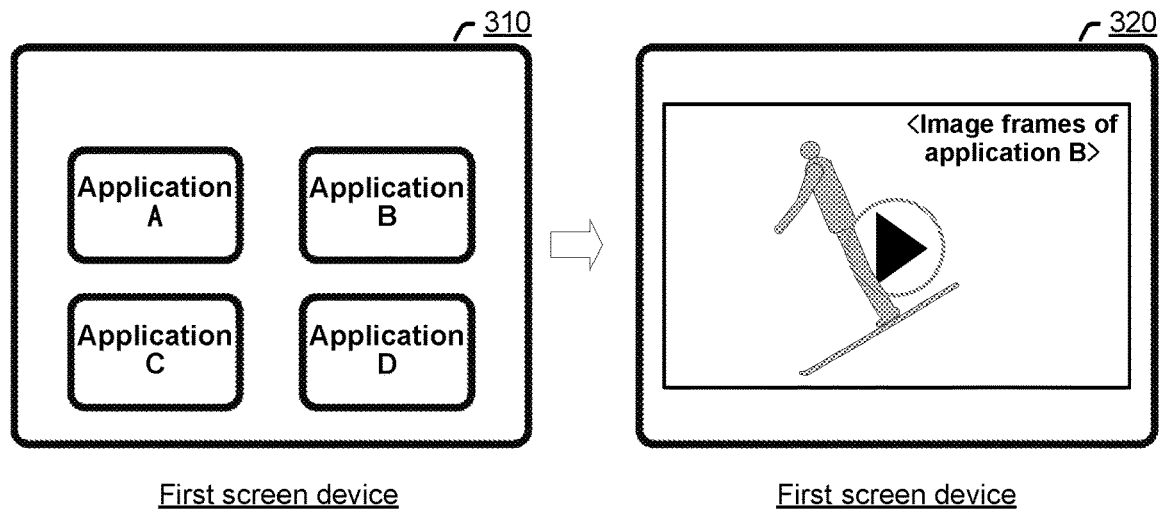
FIG. 3 illustrates an example of displaying content on a screen device according to an embodiment.

FIG. 3 illustrates an example of displaying content on a screen device according to an embodiment. As an example, FIG. 3 illustrates displaying content on a first screen device of a plurality of screen devices.

It is assumed that an image 310 is initially presented on the first screen device. For example, when the first screen device is initially connected to a screen management hub, the screen management hub may transmit initial screen display data to the first screen device, and accordingly, the first screen device may display the initial screen display data, as shown by the image 310. The initial screen display data may be, e.g., a home screen, etc. In an implementation, the initial screen display data may include a plurality of application icons, e.g., an icon of an application A, an icon of an application B, an icon of an application C, an icon of an application D, etc., included in the image 310. Each application icon is linked to a corresponding application, and when it is selected, e.g., clicked through touch, selected through voice, etc., the corresponding application may be launched and displayed. It should be understood that the initial screen display data displayed in the image 310 is only exemplary, and the embodiments of the present disclosure are not limited to any specific type of initial screen display data, but may include any more or less content in the initial screen display data. Moreover, optionally, the screen management hub may transmit the same initial screen display data to a plurality of screen devices, e.g., the same home screen. Moreover, optionally, in the case that the screen management hub obtained historical information of the first screen device, the initial screen display data transmitted to the first screen device may also be customized based on the historical information, e.g., by adopting wallpaper defined by configuration preference in the historical information, etc.

Assuming that the user selects the icon of the application B on the first screen device when the image 310 is presented on the first screen device, image frames of the application B will be further displayed on the first screen device, as shown by an image 320. Furthermore, the user may, e.g., view the image frames of the application B, operate the application B, etc., on the first screen device.

Figure 4:
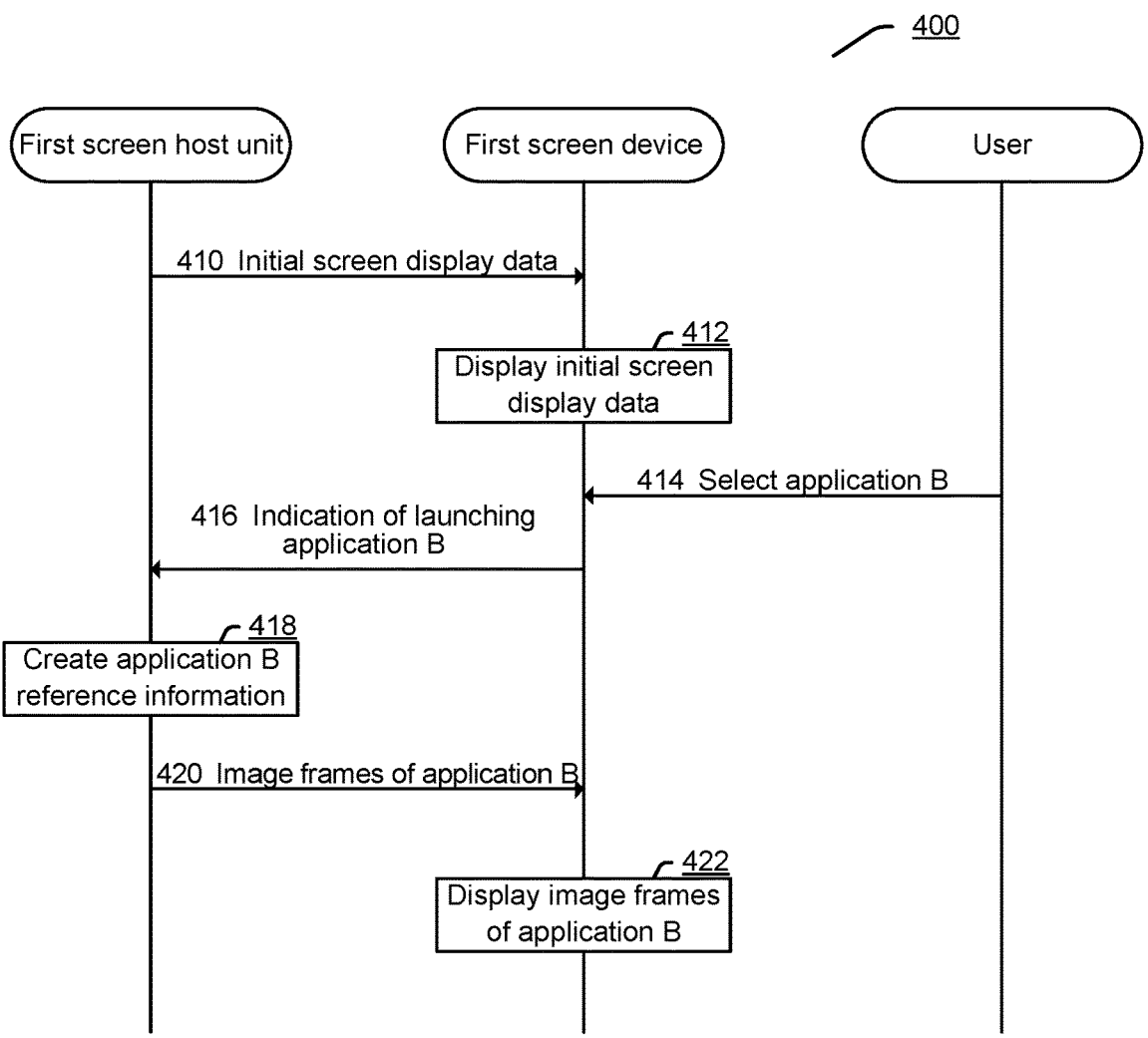
FIG. 4 illustrates an exemplary process of displaying content on a screen device according to an embodiment.

FIG. 4 illustrates an exemplary process 400 of displaying content on a screen device according to an embodiment. The process 400 is further explanation of the example in FIG. 3. It is assumed that a first screen host unit has been created in a screen management hub for a first screen device, and a connection has been established between the first screen host unit and the first screen device.

At 410, the first screen host unit may transmit screen display data, e.g., initial screen display data, to the first screen device through the connection. For example, a screen controller in the first screen host unit may transmit the initial screen display data to a client unit in the first screen device.

At 412, the first screen device may display the received initial screen display data. For example, the image 310 in FIG. 3 is presented on the first screen device.

At 414, the first screen device may receive a user operation through a user interface, e.g., an operation of selecting an application B. The application B may be used as a target application.

At 416, the first screen device may transmit an indication of launching the application B to the first screen host unit. For example, the client unit in the first screen device may transmit the indication of launching the application B to the screen controller in the first screen host unit.

After the first screen host unit receives the indication of launching the application B from the first screen device, the first screen host unit may create application B reference information corresponding to the application B at 418. For example, the application B reference information may be created by the screen controller in the first screen host unit. Although not shown, the first screen host unit may launch the application B in the screen management hub in response to receiving the indication of launching the application B.

At 420, the first screen host unit may transmit image frames of the application B to the first screen device based at least on the application B reference information. For example, the screen controller in the first screen host unit may transmit a set of image frames of the application B to the client unit in the first screen device based at least on the application B reference information.

At 422, the first screen device may display the received image frames of the application B.

It should be understood that the steps 420 and 422 in the process 400 may be continuously performed, so as to continuously update the display on the first screen device. Moreover, it should be understood that the process 400 may also be similarly performed for displaying content on other screen devices. Since different screen host units corresponding to different screen devices may be associated with different system desktop instances, a user may independently select content to be viewed on different screen devices.

Figure 5:
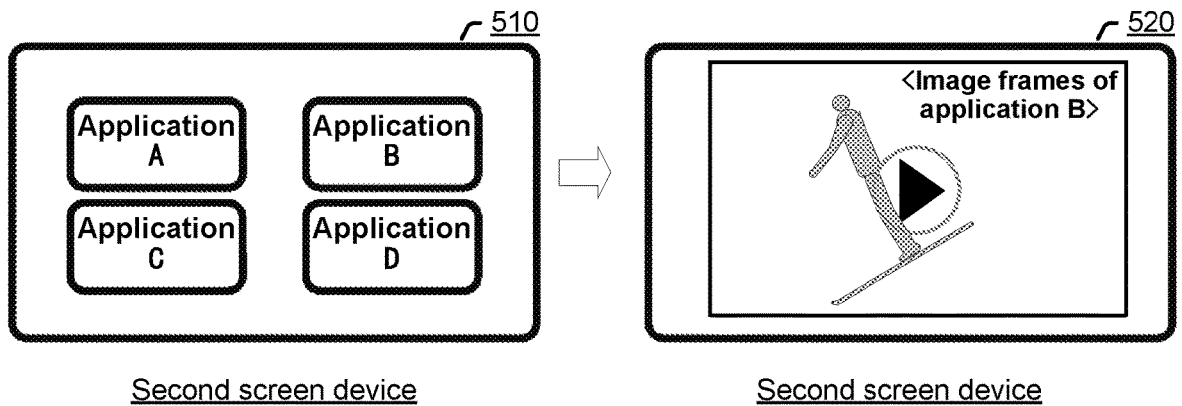
FIG. 5 illustrates an example of displaying the same content on another screen device according to an embodiment.

FIG. 5 illustrates an example of displaying the same content on another screen device according to an embodiment. As an example, FIG. 5 illustrates displaying the same content on a second screen device of a plurality of screen devices as on the first screen device in FIG. 3.

It is assumed that an image 510 is initially presented on the second screen device. Initial screen display data is displayed in the image 510. For example, the initial screen display data may be the same as the initial screen display data displayed in the image 310 in FIG. 3. It should be understood that different screen devices may have different screen information or parameter information, e.g., screen size, etc., therefore, the display of initial screen display data in each screen device needs screen information suitable for the screen device. For example, the sizes or proportions of the plurality of application icons in the image 510 on the second screen device are visually different from the sizes or proportions of these icons on the first screen device in FIG. 3.

Assuming that a user selects an icon of the application B on the second screen device when the image 510 is presented on the second screen device, image frames of the application B will be further displayed on the second screen device, as shown by an image 520. The image frames of the application B displayed in the image 520 are the same as or synchronized with the image frames of the application B displayed in the image 320 in FIG. 3, except that display formats of these image frames are visually matched to screen information of different screen devices.

Figure 6:
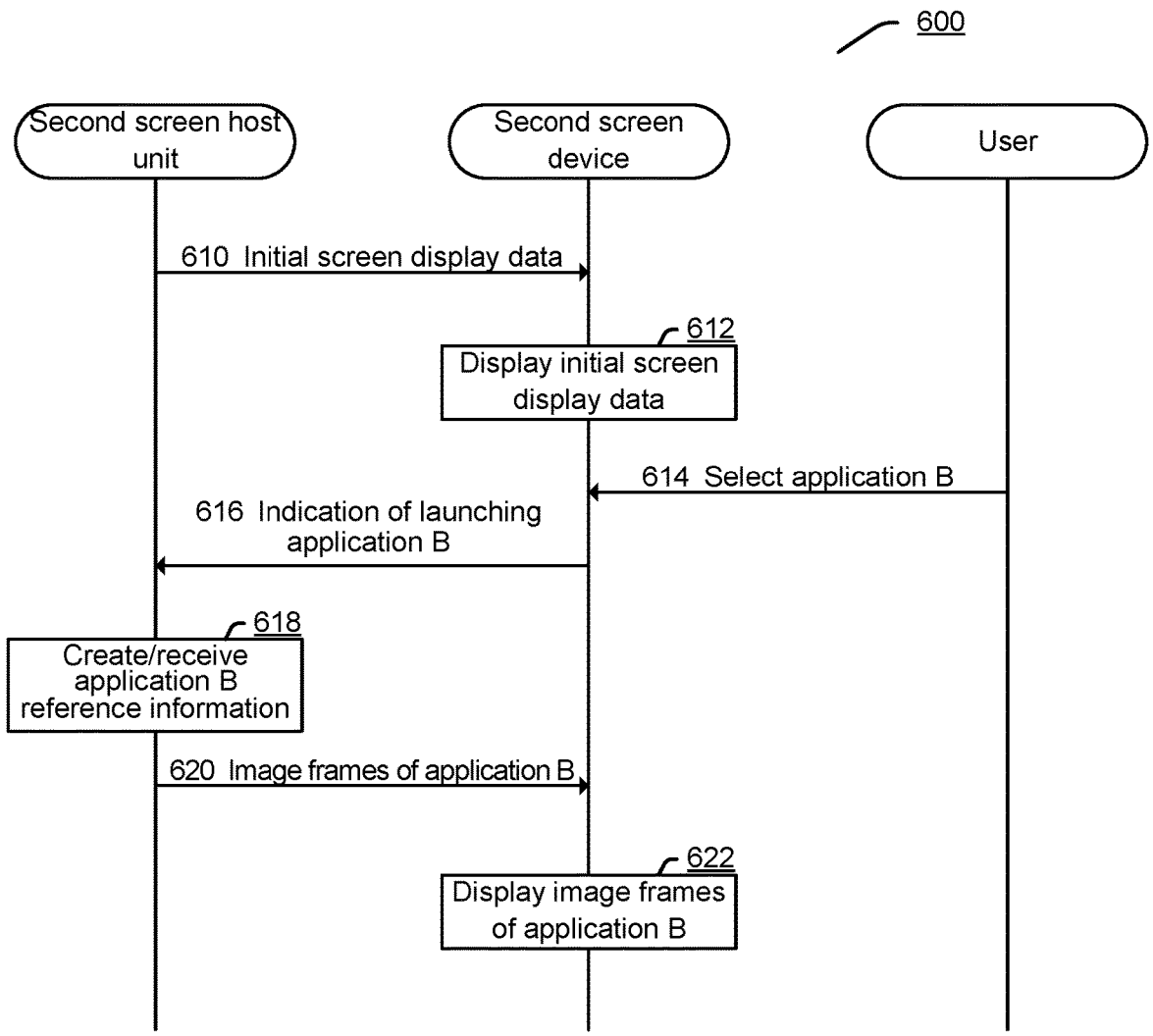
FIG. 6 illustrates an exemplary process of displaying the same content on another screen device according to an embodiment.

FIG. 6 illustrates an exemplary process 600 of displaying the same content on another screen device according to an embodiment. The process 600 is further explanation of the example in FIG. 5. It is assumed that a second screen host unit has been created in a screen management hub for a second screen device, and a connection has been established between the second screen host unit and the second screen device.

Most of the steps in the process 600 are similar to the corresponding steps in the process 400 of FIG. 4, except that the process 600 is performed for the second screen host unit and the second screen device. Moreover, at step 618, in response to receiving an indication of launching the application B, the second screen host unit may create application B reference information. In an implementation, the application B reference information created at 618 may be the same as the application B reference information created at 418 in FIG. 4, e.g., both of them point to the same storage location of the application B in the memory. Accordingly, image frames of the application B transmitted by the second screen host unit to the second screen device at 620 are also the same as the image frames of the application B transmitted by the first screen host unit to the first screen device at 420 in FIG. 4. As a result, the same content is displayed on the second screen device as on the first screen device, as shown by the image 520 and the image 320 in FIG. 3. Moreover, in an implementation, the creation of the application B reference information at 618 may also comprise directly receiving the application B reference information from the first screen host unit in FIG. 4 by the second screen host unit.

At least through the process 400 in FIG. 4 and the process 600 in FIG. 6, the same content, e.g., the same image frames of the same application, may be displayed synchronously on different screen devices. Moreover, through an approach similar to the process 600, the same content may be displayed on more other screen devices. Thus, a user may select the same application on different screen devices and view the same image frames of the application. Moreover, it should be understood that in the case that the screen management hub supports different references to the same application, e.g., in the case that application clone is supported, the application B reference information created by the second screen host unit at 618 may also be different from the application B reference information created by the first screen host unit at 418 in FIG. 4, and accordingly, the image frames of the application B transmitted by the second screen host unit at 620 may be different from the image frames of the application B transmitted by the first screen host unit at 420 in FIG. 4. Thus, different image frames of the same application B may be displayed on the first screen device and the second screen device, thereby implementing different accesses to the same application on different screen devices at the same time.

Figure 7:
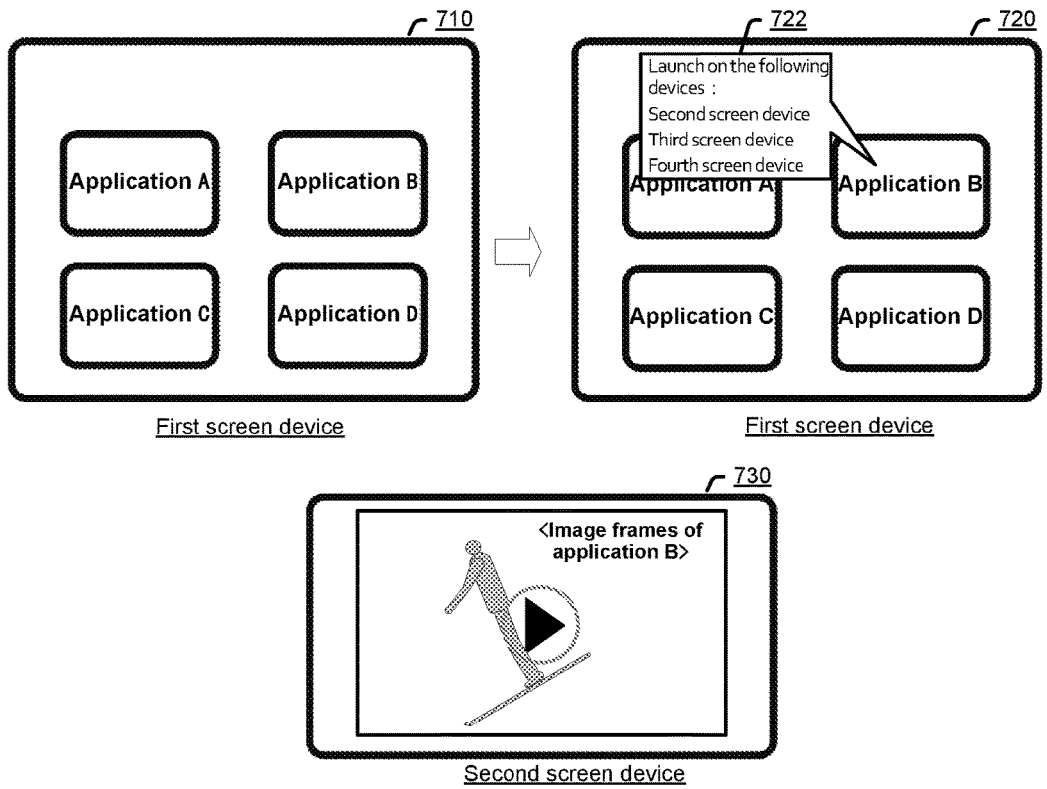
FIG. 7 illustrates an example of controlling, on a screen device, other screen devices to launch a target application according to an embodiment.

FIG. 7 illustrates an example of controlling, on a screen device, other screen devices to launch a target application according to an embodiment. As an example, FIG. 7 illustrates controlling, on a first screen device of a plurality of screen devices, a second screen device of the plurality of screen devices to launch a target application B.

It is assumed that an image 710 is being presented on the first screen device, and the image 710 includes a plurality of application icons. When a user desires to launch the application B on another screen device, the user may open a configuration menu 722 of the application B on the first screen device, wherein the configuration menu 722 may at least include options of launching the application B on which screen device, as shown in an image 720. The user may open the configuration menu 722 of the application B through various user interfaces, e.g., clicking an icon of the application B with the right button of a mouse, long pressing the icon of the application B with a finger, etc. Moreover, the configuration menu 722 displayed in the image 720 is merely exemplary. The configuration menu 722 may also include any other configuration operations to the application B. The configuration menu 722 may also adopt any other presentation formats or approaches, e.g., adopting other layouts, being presented at any other position in the image 720, adopting non-visual voice broadcasting, etc.

In response to that the user selects the second screen device in the configuration menu 722, an image 730 will be presented in the second screen device in which image frames of the application B are displayed. As the application B runs, the image frames of the application B may be continuously updated on the second screen device.

Figure 8:
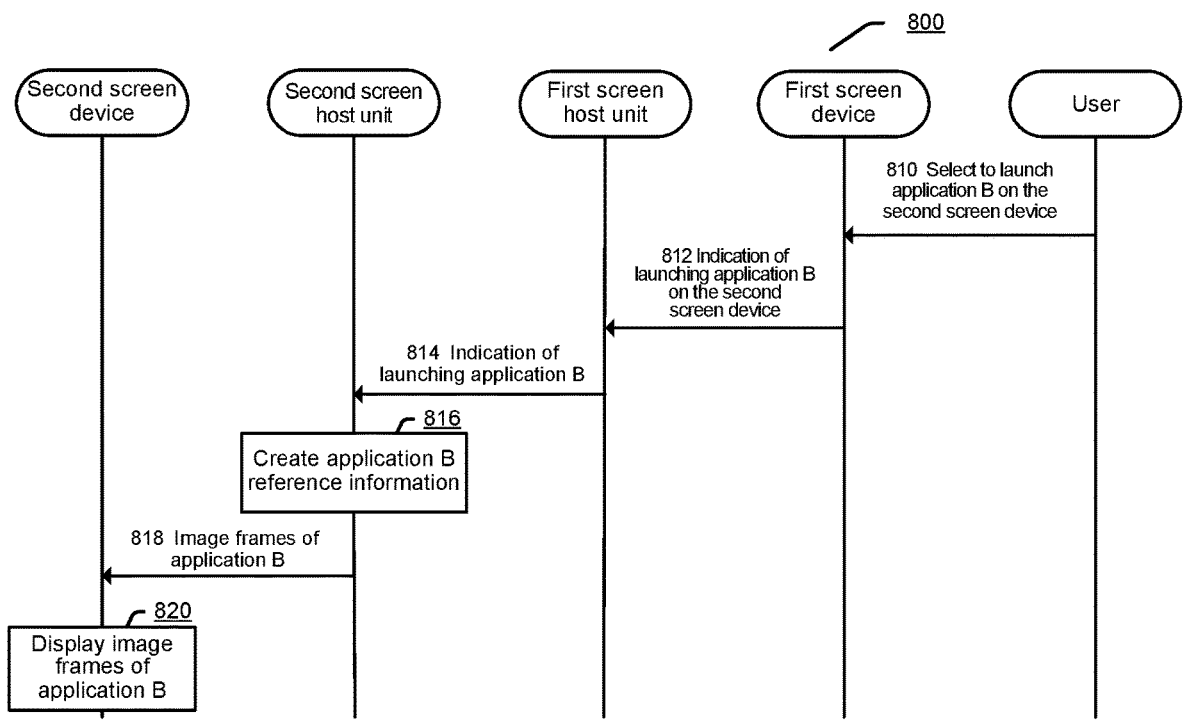
FIG. 8 illustrates an exemplary process of controlling, on a screen device, other screen devices to launch a target application according to an embodiment.

FIG. 8 illustrates an exemplary process 800 of controlling, on a screen device, other screen devices to launch a target application according to an embodiment. The process 800 is further explanation of the example in FIG. 7. It is assumed that, in a screen management hub, a first screen host unit has been created for a first screen device and a second screen host unit has been created for a second screen device, and a connection has been established between the first screen host unit and the first screen device and a connection has been established between the second screen host unit and the second screen device.

At 810, the first screen device may receive a user operation through a user interface, e.g., an operation of selecting to launch an application B on the second screen device. The application B may be used as a target application.

At 812, in response to the received user operation, the first screen device may transmit an indication of launching the application B on the second screen device to the first screen host unit. For example, a client unit in the first screen device may transmit the indication of launching the application B on the second screen device to a screen controller in the first screen host unit.

After the first screen host unit receives the indication of launching the application B on the second screen device from the first screen device, the first screen host unit may transmit an indication of launching the application B to the second screen host unit at 814. For example, the indication of launching the application B may be transmitted to a screen controller in the second screen host unit by the screen controller in the first screen host unit.

After the second screen host unit receives the indication of launching the application B from the first screen host unit, the second screen host unit may create application B reference information corresponding to the application B at 816. For example, the application B reference information may be created by the screen controller in the second screen host unit. Although not shown, the second screen host unit may launch the application B in the screen management hub in response to receiving the indication of launching the application B.

At 818, the second screen host unit may transmit image frames of the application B to the second screen device based at least on the application B reference information. For example, the screen controller in the second screen host unit may transmit a set of image frames of the application B to a client unit in the second screen device based at least on the application B reference information.

At 820, the second screen device may display the received image frames of the application B.

Figure 9:
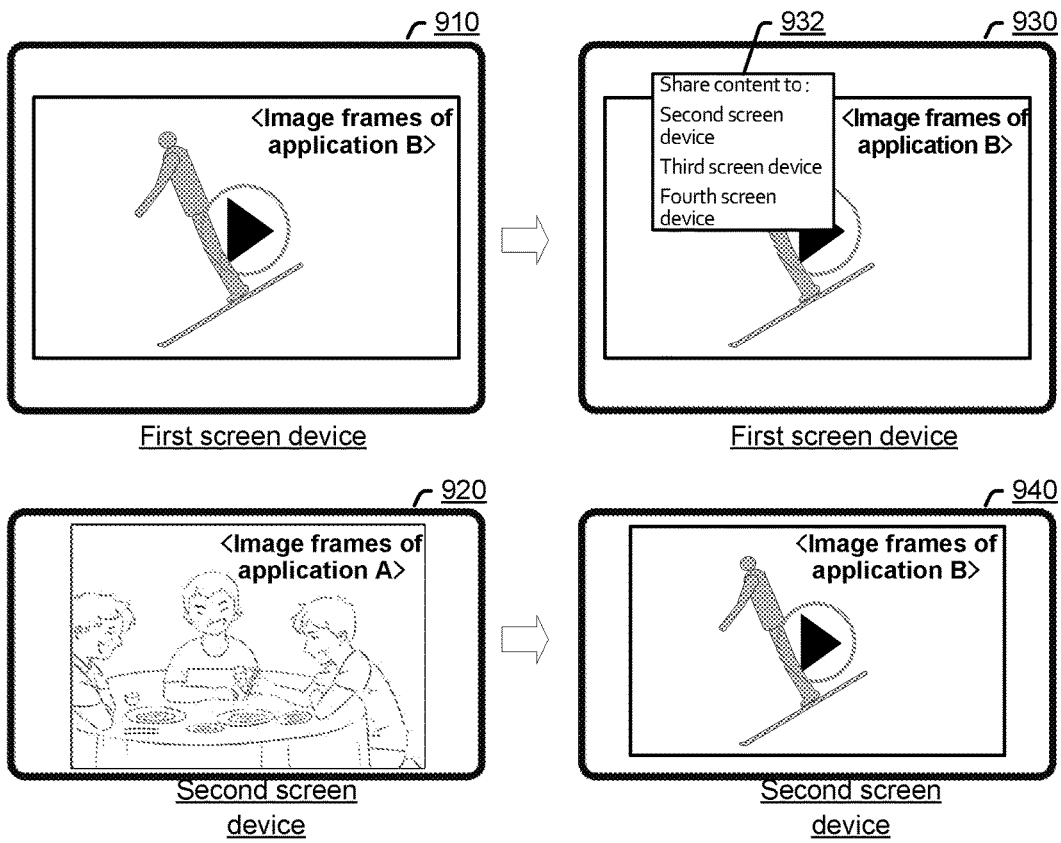
FIG. 9 illustrates an example of sharing content displayed on a screen device to other screen devices according to an embodiment.

FIG. 9 illustrates an example of sharing content displayed on a screen device to other screen devices according to an embodiment. As an example, FIG. 9 illustrates sharing screen display data displayed on a first screen device of a plurality of screen devices to a second screen device of the plurality of screen devices.

It is assumed that an image 910 is being presented on the first screen device, in which image frames of an application B, as screen display data, are displayed. At the same time, it is assumed that an image 920 is being presented on the second screen device in which image frames of an application A, as screen display data, are displayed.

When a user desires to share the image frames of the application B displayed on the first screen device to the second screen device, the user may open a configuration menu 932 for the currently-displayed content on the first screen device, and the configuration menu 932 may include at least options of sharing the currently-displayed content to which screen device, as shown in an image 930. The user may open the configuration menu 932 through various user interfaces. Moreover, the configuration menu 932 displayed in the image 930 is merely exemplary. The configuration menu 932 may also include any other configuration operations for the currently-displayed content, or adopt any other presentation formats or approaches.

In response to that the user selects the second screen device in the configuration menu 932, an image 940 will be presented in the second screen device, in which the image frames of the application B shared by the first screen device are displayed.

Figure 10:
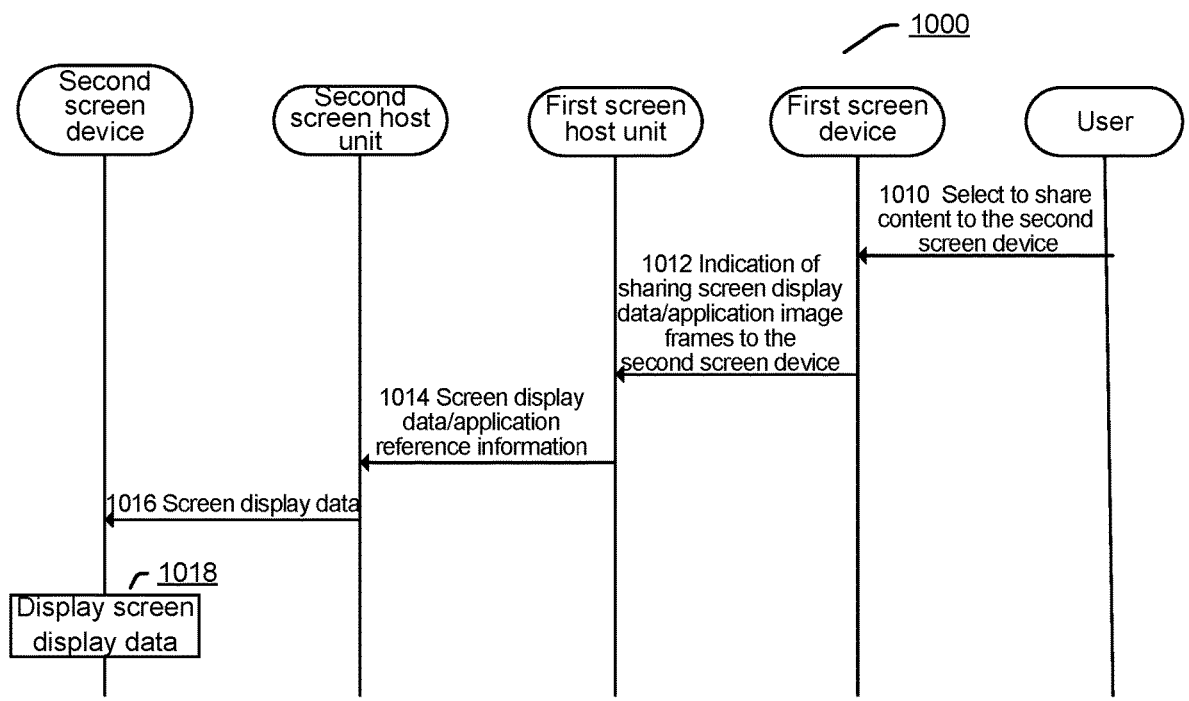
FIG. 10 illustrates an exemplary process of sharing content displayed on a screen device to other screen devices according to an embodiment.

FIG. 10 illustrates an exemplary process 1000 of sharing content displayed on a screen device to other screen devices according to an embodiment. The process 1000 is further explanation of the example in FIG. 9. It is assumed that, in a screen management hub, a first screen host unit has been created for a first screen device and a second screen host unit has been created for a second screen device, and a connection has been established between the first screen host unit and the first screen device and a connection has been established between the second screen host unit and the second screen device.

At 1010, the first screen device may receive a user operation through a user interface, e.g., an operation of selecting to share content to the second screen device.

At 1012, in response to the received user operation, the first screen device may transmit, to the first screen host unit, an indication of sharing screen display data on the first screen device to the second screen device. For example, a client unit in the first screen device may transmit, to a screen controller in the first screen host unit, the indication of sharing the screen display data on the first screen device to the second screen device. The screen display data on the first screen device may be, e.g., image frames of the application B displayed in the image 910 of FIG. 9, etc.

After the first screen host unit receives, from the first screen device, the indication of sharing the screen display data on the first screen device to the second screen device, the first screen host unit may transmit the screen display data on the first screen device to the second screen host unit at 1014. For example, the screen display data may be transmitted to a screen controller in the second screen host unit by the screen controller in the first screen host unit.

After the second screen host unit receives the screen display data on the first screen device from the first screen host unit, the second screen host unit may transmit the received screen display data to the second screen device at 1016. For example, the screen controller in the second screen host unit may transmit the received screen display data to a client unit in the second screen device.

At 1018, the second screen device may display the received screen display data on the first screen device. Accordingly, at the second screen device, screen display data previously displayed on the second screen device will be replaced by the received screen display data on the first screen device, e.g., image frames of an application A previously displayed on the second screen device will be replaced by the image frames of the application B displayed on the first screen device. It should be understood that the steps 1014, 1016 and 1018 may be continuously performed, so as to continuously display the same content on the second screen device as on the first screen device.

In the above process, the sharing of displayed content is implemented through directly transmitting screen display data from the first screen host unit to the second screen host unit. However, optionally, in another implementation, in the case that the screen display data is image frames of a target application, e.g., the image frames of the application B, the sharing of displayed content may also be implemented through transmitting application reference information from the first screen host unit to the second screen host unit. For example, at 1014, instead of transmitting the screen display data from the first screen host unit to the second screen host unit, the first screen host unit may transmit application B reference information corresponding to the application B to the second screen host unit. For example, the application B reference information corresponding to the application B may be transmitted to the screen controller in the second screen host unit by the screen controller in the first screen host unit. Accordingly, at 1016, the second screen host unit may transmit screen display data, e.g., image frames of the application B, to the second screen device based at least on the received application B reference information. In this case, since the application B reference information in the first screen host unit is the same as the application B reference information in the second screen host unit, through continuously performing the steps 1016 and 1018, the same content may be continuously displayed on the second screen device as on the first screen device.

Figure 11:
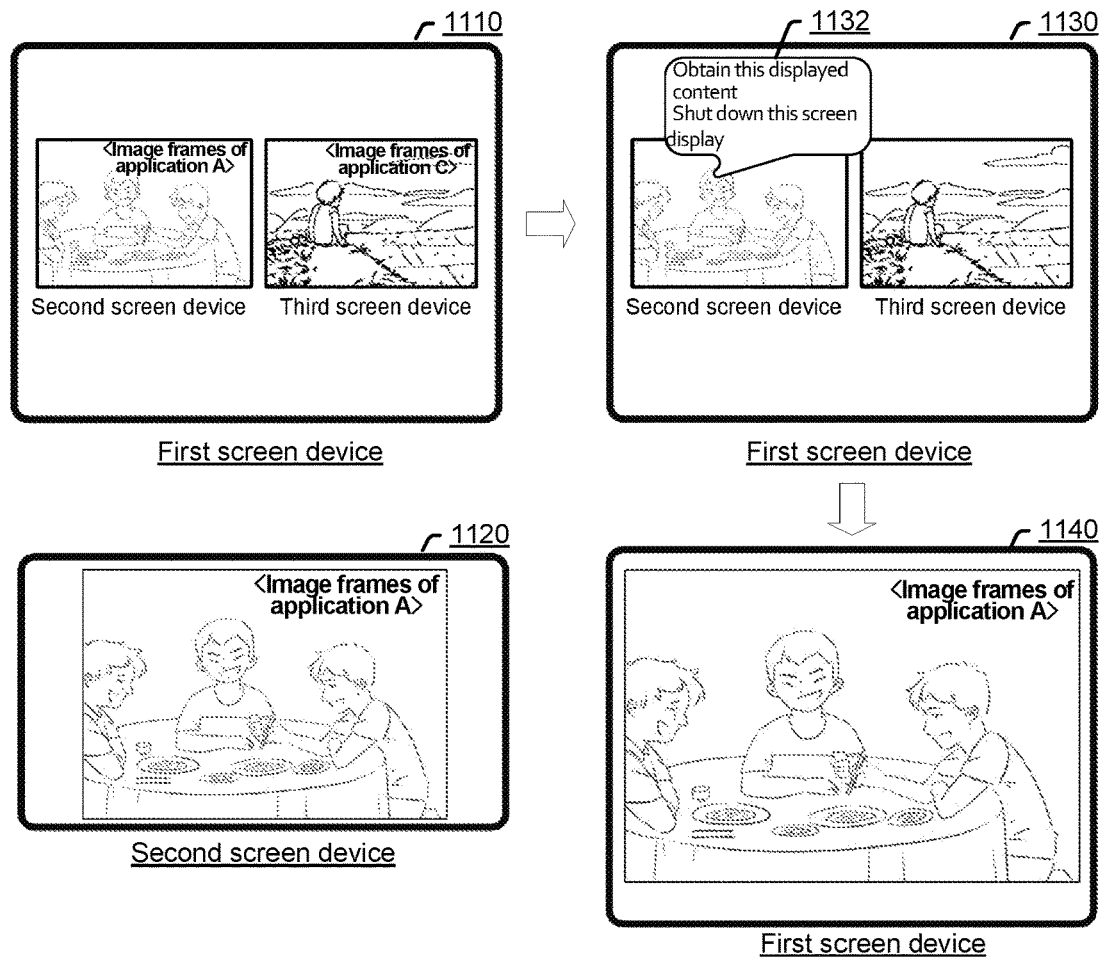
FIG. 11 illustrates an example of displaying, on a screen device, content being displayed on another screen device according to an embodiment.

FIG. 11 illustrates an example of displaying, on a screen device, content being displayed on another screen device according to an embodiment. As an example, FIG. 11 illustrates displaying, on a first screen device of a plurality of screen devices, the content being displayed on a second screen device of the plurality of screen devices.

It is assumed that an image 1110 is being presented on the first screen device, and the image 1110 includes a plurality of views for presenting content being displayed on other screen devices. For example, a view presents image frames of an application A being displayed on the second screen device, and another view presents image frames of an application C being displayed on a third screen device. According to the embodiments of the present disclosure, a plurality of screen host units in a screen management hub may transmit their respective screen display data to each other, so that a plurality of views related to other screen devices may be presented on any screen device. As an example, FIG. 11 illustrates that, when an image 1110 is being presented on the first screen device, an image 1120 is being presented on the second screen device, wherein the image 1120 corresponds to the view corresponding to the second screen device in the image 1110.

When the user desires to display, on the first screen device, the content being displayed on the second screen device, the user may open, on the first screen device, a configuration menu 1132 for a view corresponding to the second screen device, wherein the configuration menu 1132 may at least include an option "Obtain this displayed content" for obtaining, on the first screen device, the content being displayed on the second screen device, as shown in an image 1130. The user may open the configuration menu 1132 through various user interfaces. Moreover, the configuration menu 1132 displayed in the image 1130 is merely exemplary. The configuration menu 1132 may also include any other configuration operations for the view corresponding to the second screen device, e.g., an option "Shut down this screen display" as shown for shutting down the screen display on the second screen device, or any other operation options that are not shown, and the configuration menu 1132 may also adopt any other presenting formats or approaches.

In response to that the user selects, in the configuration menu 1132, to obtain the content being displayed on the second screen device, an image 1140 will be presented in the first screen device, wherein the image 1140 displays the content being displayed on the second screen device, i.e., the image frames of the application A.

Figure 12:
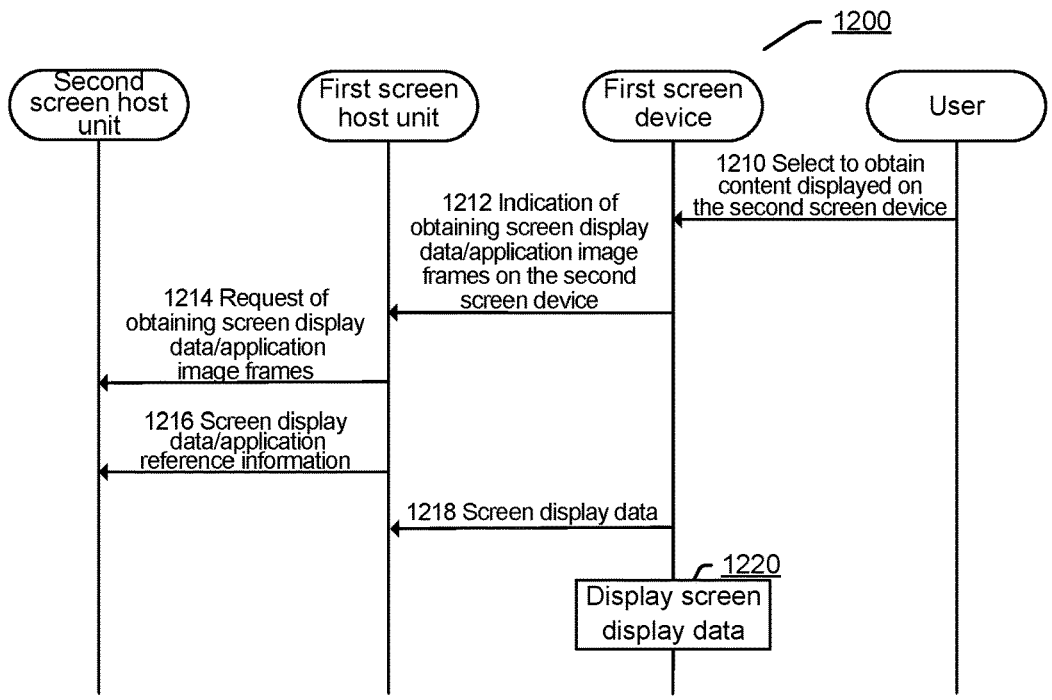
FIG. 12 illustrates an exemplary process of displaying, on a screen device, content being displayed on another screen device according to an embodiment.

FIG. 12 illustrates an exemplary process 1200 of displaying, on a screen device, content being displayed on another screen device according to an embodiment. The process 1200 is further explanation of the example in FIG. 11. It is assumed that, in a screen management hub, a first screen host unit has been created for a first screen device and a second screen host unit has been created for a second screen device, and a connection has been established between the first screen host unit and the first screen device and a connection has been established between the second screen host unit and the second screen device.

At 1210, the first screen device may receive a user operation through a user interface, e.g., an operation of selecting to obtain content being displayed on the second screen device.

At 1212, in response to the received user operation, the first screen device may transmit an indication of obtaining screen display data on the second screen device to the first screen host unit. For example, a client unit in the first screen device may transmit the indication of obtaining the screen display data on the second screen device to a screen controller in the first screen host unit. The screen display data on the second screen device may be, e.g., the image frames of the application A displayed in the image 1120 of FIG. 11, etc.

After the first screen host unit receives, from the first screen device, the indication of obtaining the screen display data on the second screen device, the first screen host unit may transmit a request of obtaining the screen display data on the second screen device to the second screen host unit at 1214. For example, the request may be transmitted to a screen controller in the second screen host unit by the screen controller in the first screen host unit.

After the second screen host unit receives, from the first screen host unit, the request of obtaining the screen display data on the second screen device, the second host unit may transmit the screen display data on the second screen device to the first screen host unit at 1216. For example, the screen display data may be transmitted to the screen controller in the first screen host unit by the screen controller in the second screen host unit.

After the first screen host unit receives the screen display data on the second screen device from the second screen host unit, the first screen host unit may transmit the received screen display data to the first screen device at 1218. For example, the screen controller in the first screen host unit may transmit the received screen display data to the client unit in the first screen device.

At 1220, the first screen device may display the received screen display data on the second screen device. Accordingly, at the first screen, screen display data previously displayed on the first screen device will be replaced by the screen display data on the second screen device, e.g., the image 1130 previously displayed on the first screen device is replaced by the image frames of the application A displayed on the second screen device. It should be understood that the steps 1216, 1218 and 1220 may be continuously performed, so as to continuously display the same content on the first screen device as on the second screen device.

In the above process, the obtaining of content displayed on the second screen device is implemented through directly transmitting screen display data from the second screen host unit to the first screen host unit. However, optionally, in another implementation, in the case that the screen display data is image frames of a target application, e.g., the image frames of the application A, the obtaining of the content displayed on the second screen device may also be implemented through transmitting application reference information from the second screen host unit to the first screen host unit. For example, at 1216, instead of transmitting the screen display data from the second screen host unit to the first screen host unit, the second screen host unit may transmit application A reference information corresponding to the application A to the first screen host unit. For example, the application A reference information corresponding to the application A may be transmitted to the screen controller in the first screen host unit by the screen controller in the second screen host unit. Accordingly, at 1218, the first screen host unit may transmit screen display data, e.g., image frames of the application A, to the first screen device based at least on the received application A reference information. In this case, since the application A reference information in the first screen host unit is the same as the application A reference information in the second screen host unit, through continuously performing the steps 1218 and 1220, the same content may be continuously displayed on the first screen device as on the second screen device.

Figure 13:
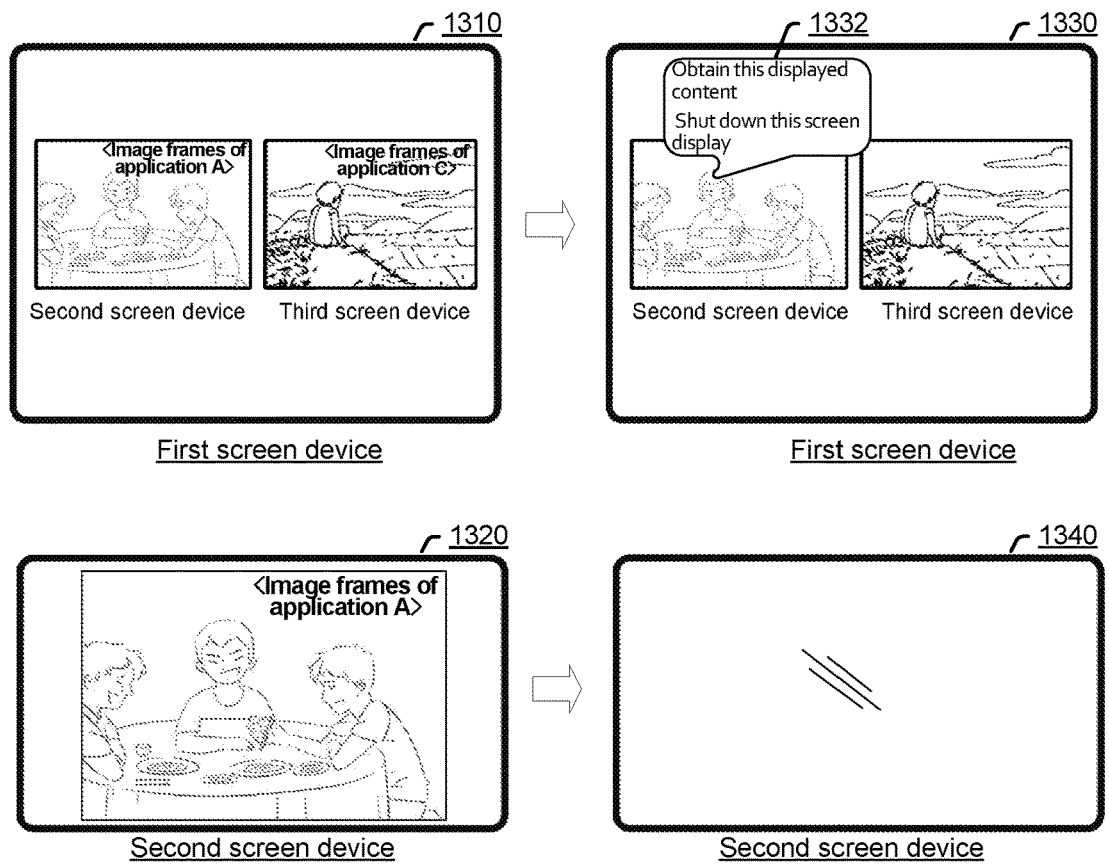
FIG. 13 illustrates an example of shutting down, on a screen device, screen display on another screen device according to an embodiment.

FIG. 13 illustrates an example of shutting down, on a screen device, screen display on another screen device according to an embodiment. As an example, FIG. 13 illustrates shutting down, on a first screen device of a plurality of screen devices, screen display on a second screen device of the plurality of screen devices.

It is assumed that an image 1310 is being presented on the first screen device, and the image 1310 includes a plurality of views for presenting content being displayed on other screen devices. For example, a view presents image frames of an application A being displayed on the second screen device, and another view presents image frames of an application C being displayed on a third screen device. As an example, FIG. 13 illustrates that, when an image 1310 is being presented on the first screen device, an image 1320 is being presented on the second screen device, wherein the image 1320 corresponds to the view corresponding to the second screen device in the image 1310.

When the user desires to shut down, on the first screen device, the screen display on the second screen device, the user may open, on the first screen device, a configuration menu 1332 for a view corresponding to the second screen device, wherein the configuration menu 1332 may at least include an option "Shut down this screen display" for shutting down the screen display on the second screen device, as shown in an image 1330. The configuration menu 1332 may correspond to the configuration menu 1132 in FIG. 11. The user may open the configuration menu 1332 through various user interfaces. Moreover, the configuration menu 1332 displayed in the image 1330 is merely exemplary. The configuration menu 1332 may also include any other configuration operations for the view corresponding to the second screen device, or adopt any other presenting formats or approaches.

In response to that the user selects, in the configuration menu 1332, to shut down the screen display on the second screen device, an image without content or a black screen 1340 will be presented in the second screen device.

Figure 14:
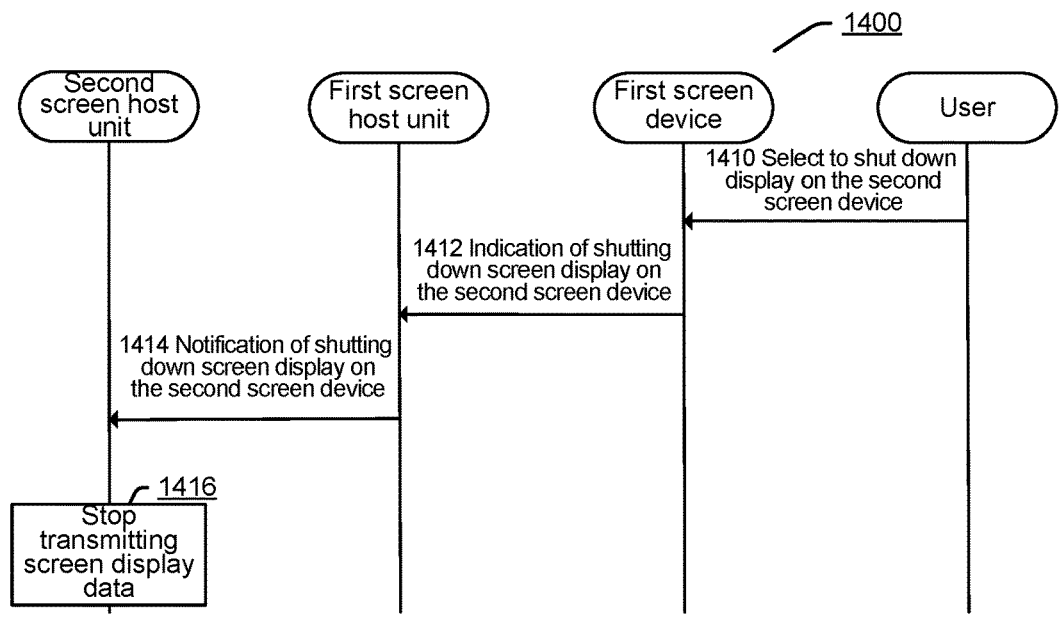
FIG. 14 illustrates an exemplary process of shutting down, on a screen device, screen display on another screen device according to an embodiment.

FIG. 14 illustrates an exemplary process 1400 of shutting down, on a screen device, screen display on another screen device according to an embodiment. The process 1400 is further explanation of the example in FIG. 13. It is assumed that, in a screen management hub, a first screen host unit has been created for a first screen device and a second screen host unit has been created for a second screen device, and a connection has been established between the first screen host unit and the first screen device and a connection has been established between the second screen host unit and the second screen device.

At 1410, the first screen device may receive a user operation through a user interface, e.g., an operation of selecting to shut down screen display on the second screen device.

At 1412, in response to the received user operation, the first screen device may transmit an indication of shutting down screen display on the second screen device to the first screen host unit. For example, a client unit in the first screen device may transmit the indication of shutting down the screen display on the second screen device to a screen controller in the first screen host unit.

After the first screen host unit receives, from the first screen device, the indication of shutting down the screen display on the second screen device, the first screen host unit may transmit a notification of shutting down the screen display on the second screen device to the second screen host unit at 1414. For example, the notification may be transmitted to a screen controller in the second screen host unit by the screen controller in the first screen host unit.

After the second screen host unit receives, from the first screen host unit, the notification of shutting down the screen display on the second screen device, the second host unit may stop transmitting screen display data to the second screen device at 1416. For example, the screen controller in the second screen host unit stops transmitting any screen display data to the second screen device. Accordingly, no content will be displayed on the second screen device, e.g., presenting a black screen, an image without content, etc. Optionally, in the case that the screen management hub has an authority to control the startup and shutdown of a screen device, the second screen host unit may also enable the second screen device to shut down at 1416.

The above FIG. 2 to FIG. 14 relate to several exemplary application scenarios of multi-screen management according to the embodiments of the present disclosure, and it should be understood that the embodiments of the present disclosure may also cover any other application scenarios. In an implementation, in the case that a screen device has high processing capability or intelligence level, the screen device may provide screen display data to the screen management hub, such that the screen display data is displayed on other screen devices, thus achieving the sharing of screen display data generated by the screen device itself to other screen devices. For example, assuming that the screen device is installed with its own application, screen display data generated by running the application on the screen device may be provided to the screen management hub, and the screen management hub may further provide the screen display data to other screen devices through corresponding screen host units. Specifically, assuming that a first screen device is a screen device that can provide screen display data and has high processing capability or intelligence level, a first screen host unit corresponding to the first screen device may receive screen display data from the first screen device, and the first screen host unit may further transmit the received screen display data to at least one other screen control unit, accordingly, the at least one other screen control unit may transmit the screen display data to at least one corresponding screen device. Moreover, in an implementation, the screen management hub may also receive content from an external signal source, and push the content, as screen display data, to any one of a plurality of screen devices.

Figure 15:
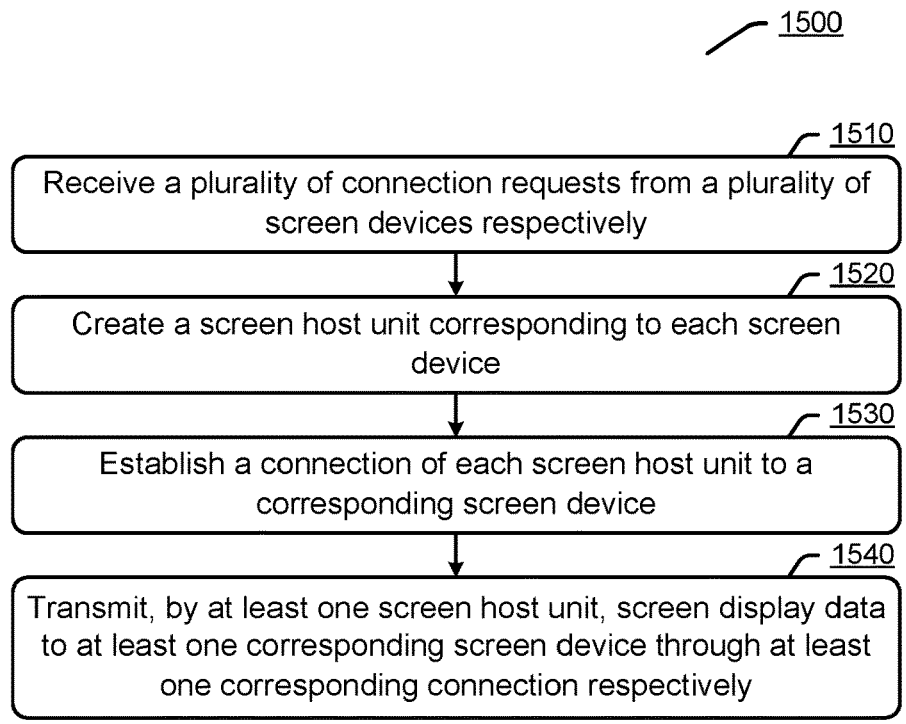
FIG. 15 illustrates a flowchart of an exemplary method for multi-screen management according to an embodiment.

FIG. 15 illustrates a flowchart of an exemplary method 1500 for multi-screen management according to an embodiment. The method 1500 may be performed by a screen management hub.

At 1510, a plurality of connection requests from a plurality of screen devices respectively may be received.

At 1520, a screen host unit corresponding to each screen device may be created.

At 1530, a connection of each screen host unit to a corresponding screen device may be established.

At 1540, screen display data may be transmitted, by at least one screen host unit, to at least one corresponding screen device through at least one corresponding connection respectively.

In an implementation, each screen host unit may be associated with a system desktop instance.

In an implementation, each screen host unit may comprise a screen controller. The establishing a connection and the transmitting screen display data may be performed by the screen controller.

In an implementation, the method 1500 may further comprise: receiving, by a first screen host unit, an indication of launching a target application, from a corresponding first screen device; and creating, by the first screen host unit, first application reference information corresponding to the target application. The transmitting screen display data may comprise: transmitting, by the first screen host unit, a first set of image frames of the target application to the first screen device based at least on the first application reference information.

The method 1500 may further comprise: receiving, by a second screen host unit, an indication of launching the target application, from a corresponding second screen device; and creating or receiving, by the second screen host unit, second application reference information corresponding to the target application. The transmitting screen display data may comprise: transmitting, by the second screen host unit, a second set of image frames of the target application to the second screen device based at least on the second application reference information.

The second application reference information may be the same as the first application reference information, and the second set of image frames may be the same as the first set of image frames.

In an implementation, the method 1500 may further comprise: receiving, by a first screen host unit, an indication of launching a target application on a second screen device, from a corresponding first screen device; and creating, by a second screen host unit corresponding to the second screen device, application reference information corresponding to the target application. The transmitting screen display data may comprise: transmitting, by the second screen host unit, image frames of the target application to the second screen device based at least on the application reference information.

In an implementation, the method 1500 may further comprise: receiving, by a first screen host unit, an indication of sharing screen display data on a first screen device to a second screen device, from the corresponding first screen device; and transmitting, by the first screen host unit, the screen display data to a second screen host unit corresponding to the second screen device. The transmitting screen display data may comprise: transmitting, by the second screen host unit, the screen display data to the second screen device.

In an implementation, the method 1500 may further comprise: receiving, by a first screen host unit, an indication of sharing image frames of a target application on a first screen device to a second screen device, from the corresponding first screen device; and transmitting, by the first screen host unit, application reference information corresponding to the target application, to a second screen host unit corresponding to the second screen device. The transmitting screen display data may comprise: transmitting, by the second screen host unit, the image frames of the target application to the second screen device based at least on the application reference information.

In an implementation, the method 1500 may further comprise: receiving, by a first screen host unit, an indication of obtaining screen display data on a second screen device, from a corresponding first screen device; and receiving, by the first screen host unit, the screen display data from a second screen host unit corresponding to the second screen device. The transmitting screen display data may comprise: transmitting, by the first screen host unit, the screen display data to the first screen device.

In an implementation, the method 1500 may further comprise: receiving, by a first screen host unit, an indication of obtaining image frames of a target application on a second screen device, from a corresponding first screen device; and receiving, by the first screen host unit, application reference information corresponding to the target application, from a second screen host unit corresponding to the second screen device. The transmitting screen display data may comprise: transmitting, by the first screen host unit, the image frames of the target application to the first screen device based at least on the application reference information.

In an implementation, the method 1500 may further comprise: receiving, by a first screen host unit, an indication of shutting down screen display on a second screen device, from a corresponding first screen device; transmitting, by the first screen host unit, a notification of shutting down screen display on the second screen device, to a second screen host unit corresponding to the second screen device; and stopping, by the second screen host unit, transmission of screen display data to the second screen device.

In an implementation, the method 1500 may further comprise: receiving, by a first screen host unit, screen display data from a corresponding first screen device; and transmitting, by the first screen host unit, the screen display data to at least a second screen host unit. The transmitting screen display data may comprise: transmitting, by at least the second screen host unit, the screen display data to at least a corresponding second screen device.

In an implementation, the transmitting screen display data may comprise: transmitting, by the at least one screen host unit, the same initial screen display data to the at least one corresponding screen device through the at least one corresponding connection respectively.

The initial screen display data may comprises a plurality of application icons.

In an implementation, the creating a screen host unit corresponding to each screen device may comprise: creating the screen host unit based on historical information of the screen device.

It should be understood that the method 1500 may further comprise any step/process for multi-screen management according to the above embodiments of the present disclosure.

Figure 16:
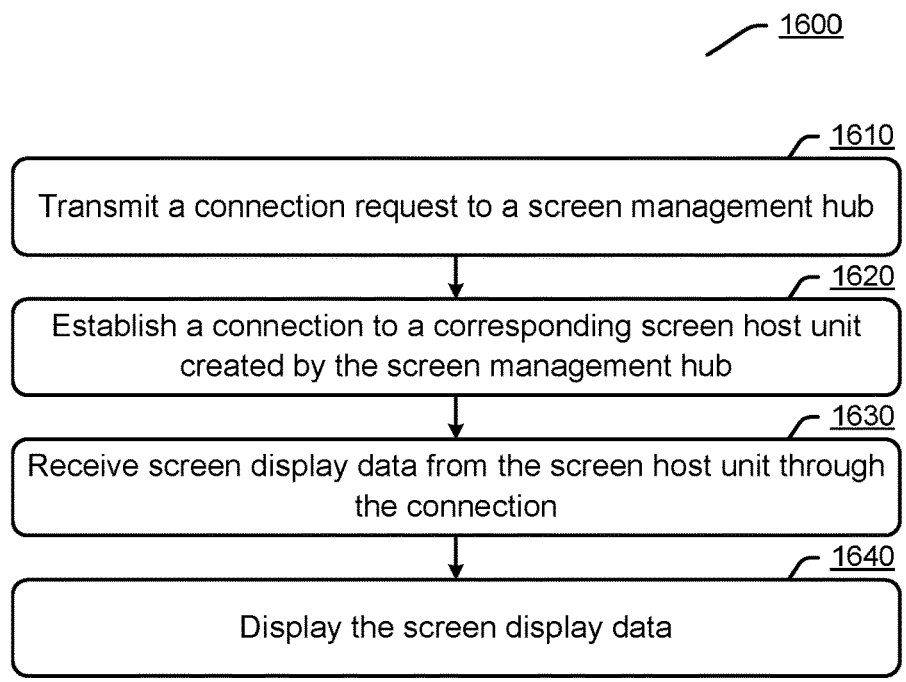
FIG. 16 illustrates a flowchart of an exemplary method for multi-screen management according to an embodiment.

FIG. 16 illustrates a flowchart of an exemplary method 1600 for multi-screen management according to an embodiment. The method 1600 may be performed by a screen device.

At 1610, a connection request may be transmitted to a screen management hub.

At 1620, a connection to a corresponding screen host unit created by the screen management hub may be established.

At 1630, screen display data may be received from the screen host unit through the connection.

At 1640, the screen display data may be displayed.

In an implementation, the method 1600 may further comprise: receiving a user operation through a user interface; and transmitting an indication corresponding to the user operation to the screen host unit.

It should be understood that the method 1600 may further comprise any step/process for multi-screen management according to the above embodiments of the present disclosure.

Figure 17:
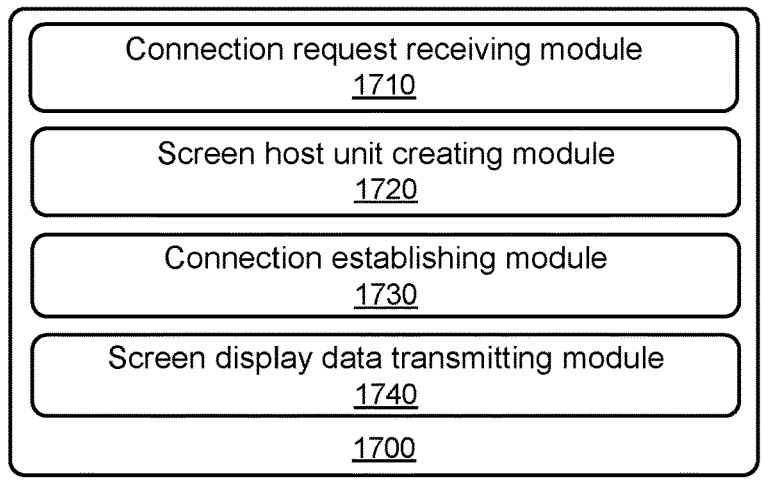
FIG. 17 illustrates an exemplary apparatus for multi-screen management according to an embodiment.

FIG. 17 illustrates an exemplary apparatus 1700 for multi-screen management according to an embodiment. The apparatus 1700 may be implemented at a screen management hub.

The apparatus 1700 may comprise: a connection request receiving module 1710, for receiving a plurality of connection requests from a plurality of screen devices respectively; a screen host unit creating module 1720, for creating a screen host unit corresponding to each screen device; a connection establishing module 1730, for establishing a connection of each screen host unit to a corresponding screen device; and a screen display data transmitting module 1740, for transmitting, by at least one screen host unit, screen display data to at least one corresponding screen device through at least one corresponding connection respectively.

Moreover, the apparatus 1700 may further comprise any other module that performs the steps of the methods for multi-screen management according to the above embodiments of the present disclosure.

Figure 18:
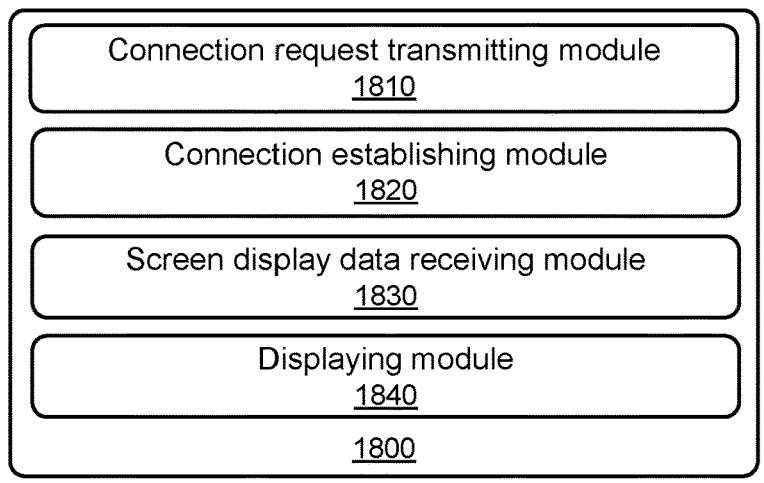
FIG. 18 illustrates an exemplary apparatus for multi-screen management according to an embodiment.

FIG. 18 illustrates an exemplary apparatus 1800 for multi-screen management according to an embodiment. The apparatus 1800 may be implemented at a screen device.

The apparatus 1800 may comprise: a connection request transmitting module 1810, for transmitting a connection request to a screen management hub; a connection establishing module 1820, for establishing a connection to a corresponding screen host unit created by the screen management hub; a screen display data receiving module 1830, for receiving screen display data from the screen host unit through the connection; and a displaying module 1840, for displaying the screen display data.

Moreover, the apparatus 1800 may further comprise any other module that performs the steps of the methods for multi-screen management according to the above embodiments of the present disclosure.

Figure 19:
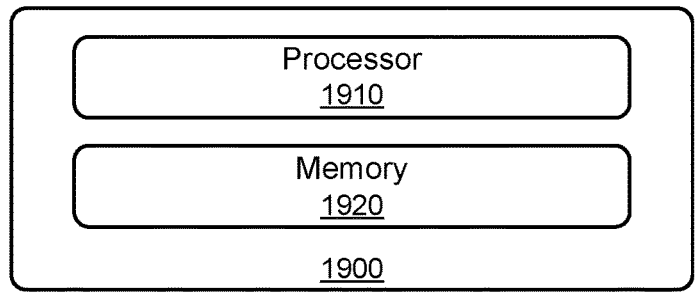
FIG. 19 illustrates an exemplary apparatus for multi-screen management according to an embodiment.

FIG. 19 illustrates an exemplary apparatus 1900 for multi-screen management according to an embodiment.

The apparatus 1900 may comprise: at least one processor 1910; and a memory 1920 storing computer-executable instructions. When the computer-executable instructions are executed, the at least one processor 1910 may perform any step/process of the methods for multi-screen management according to the above embodiments of the present disclosure.

The embodiments of the present disclosure propose a computer program product for multi-screen management, comprising a computer program that is executed by at least one processor for performing any step/process of the methods for multi-screen management according to the above embodiments of the present disclosure.

The embodiments of the present disclosure may be embodied in a non-transitory computer-readable medium. The non-transitory computer readable medium may comprise instructions that, when executed, cause one or more processors to perform any step/process of the methods for multi-screen management according to the above embodiments of the present disclosure.

It should be appreciated that all the operations in the methods described above are merely exemplary, and the present disclosure is not limited to any operations in the methods or sequence orders of these operations, and should cover all other equivalents under the same or similar concepts.

In addition, the articles "a" and "an" as used in this description and appended claims, unless otherwise specified or clear from the context that they are for the singular form, should generally be interpreted as meaning "one" or "one or more."

It should also be appreciated that all the modules in the apparatuses described above may be implemented in various approaches. These modules may be implemented as hardware, software, or a combination thereof. Moreover, any of these modules may be further functionally divided into sub-modules or combined together.

Processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in the present disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout the present disclosure. The functionality of a processor, any portion of a processor, or any combination of processors presented in the present disclosure may be implemented with software being executed by a microprocessor, micro-controller, DSP, or other suitable platform.

Software shall be construed broadly to mean instructions, instruction sets, code, code segments, program code, programs, subprograms, software modules, applications, software applications, software packages, routines, subroutines, objects, threads of execution, procedures, functions, etc. The software may reside on a computer-readable medium. A computer-readable medium may include, by way of example, memory such as a magnetic storage device (e.g., hard disk, floppy disk, magnetic strip), an optical disk, a smart card, a flash memory device, random access memory (RAM), read only memory (ROM), programmable ROM (PROM), erasable PROM (EPROM), electrically erasable PROM (EEPROM), a register, or a removable disk. Although a memory is shown as being separate from the processor in various aspects presented in this disclosure, a memory may also be internal to the processor (e.g., a cache or a register).

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein. All structural and functional equivalents to the elements of the various aspects described throughout the present disclosure that are known or later come to be known to those of ordinary skilled in the art are intended to be encompassed by the claims.

The invention claimed is:

1. A method for multi-screen management, comprising:
receiving a plurality of connection requests from a plurality of screen devices respectively;
creating a screen host unit corresponding to each screen device;
establishing a connection of each screen host unit to a corresponding screen device;
transmitting, by at least one screen host unit, screen display data to at least one corresponding screen device through at least one corresponding connection respectively;
receiving, by a first screen host unit, an indication of shutting down screen display on a second screen device, from a corresponding first screen device;
transmitting, by the first screen host unit, a notification of shutting down screen display on the second screen device, to a second screen host unit corresponding to the second screen device; and
stopping, by the second screen host unit, transmission of screen display data to the second screen device.

2. The method of claim 1, wherein
each screen host unit is associated with a system desktop instance.

3. The method of claim 1, wherein
each screen host unit comprises a screen controller, and
the establishing a connection and the transmitting screen display data are performed by the screen controller.

4. The method of claim 1, further comprising:
receiving, by a first screen host unit, an indication of launching a target application, from a corresponding first screen device; and
creating, by the first screen host unit, first application reference information corresponding to the target application, and wherein the transmitting screen display data comprises:
transmitting, by the first screen host unit, a first set of image frames of the target application to the first screen device based at least on the first application reference information.

5. The method of claim 4, further comprising:
receiving, by a second screen host unit, an indication of launching the target application, from a corresponding second screen device; and
creating or receiving, by the second screen host unit, second application reference information corresponding to the target application, and
wherein the transmitting screen display data comprises:
transmitting, by the second screen host unit, a second set of image frames of the target application to the second screen device based at least on the second application reference information.

6. The method of claim 1, further comprising:
receiving, by a first screen host unit, an indication of launching a target application on a second screen device, from a corresponding first screen device; and
creating, by a second screen host unit corresponding to the second screen device, application reference information corresponding to the target application, and
wherein the transmitting screen display data comprises:
transmitting, by the second screen host unit, image frames of the target application to the second screen device based at least on the application reference information.

7. The method of claim 1, further comprising:
receiving, by a first screen host unit, an indication of sharing screen display data on a first screen device to a second screen device, from the corresponding first screen device; and
transmitting, by the first screen host unit, the screen display data to a second screen host unit corresponding to the second screen device, and
wherein the transmitting screen display data comprises:
transmitting, by the second screen host unit, the screen display data to the second screen device.

8. The method of claim 1, further comprising:
receiving, by a first screen host unit, an indication of sharing image frames of a target application on a first screen device to a second screen device, from the corresponding first screen device; and
transmitting, by the first screen host unit, application reference information corresponding to the target application, to a second screen host unit corresponding to the second screen device, and
wherein the transmitting screen display data comprises:
transmitting, by the second screen host unit, the image frames of the target application to the second screen device based at least on the application reference information.

9. The method of claim 1, further comprising:
receiving, by a first screen host unit, an indication of obtaining screen display data on a second screen device, from a corresponding first screen device; and
receiving, by the first screen host unit, the screen display data from a second screen host unit corresponding to the second screen device, and
wherein the transmitting screen display data comprises:
transmitting, by the first screen host unit, the screen display data to the first screen device.

10. The method of claim 1, further comprising:
receiving, by a first screen host unit, an indication of obtaining image frames of a target application on a second screen device, from a corresponding first screen device; and
receiving, by the first screen host unit, application reference information corresponding to the target application, from a second screen host unit corresponding to the second screen device, and
wherein the transmitting screen display data comprises: transmitting, by the first screen host unit, the image frames of the target application to the first screen device based at least on the application reference information.

11. The method of claim 1, further comprising:
receiving, by a first screen host unit, screen display data from a corresponding first screen device; and
transmitting, by the first screen host unit, the screen display data to at least a second screen host unit, and
wherein the transmitting screen display data comprises: transmitting, by at least the second screen host unit, the screen display data to at least a corresponding second screen device.

12. A method for multi-screen management, comprising:
transmitting a connection request to a screen management hub;
establishing a connection to a corresponding screen host unit created by the screen management hub;
receiving screen display data from the screen host unit through the connection;
displaying the screen display data; and
receiving, by a first screen host unit, an indication of shutting down screen display on a second screen device, from a corresponding first screen device;
transmitting, by the first screen host unit, a notification of shutting down screen display on the second screen device, to a second screen host unit corresponding to the second screen device; and
stopping, by the second screen host unit, transmission of screen display data to the second screen device.

13. An apparatus for multi-screen management, comprising:
at least one processor; and
a memory storing computer-executable instructions that, when executed, cause the at least one processor to perform;
receiving a plurality of connection requests from a plurality of screen devices respectively;
creating a screen host unit corresponding to each screen device;
establishing a connection of each screen host unit to a corresponding screen device;
transmitting, by at least one screen host unit, screen display data to at least one corresponding screen device through at least one corresponding connection respectively;
receiving, by a first screen host unit, an indication of shutting down screen display on a second screen device, from a corresponding first screen device;
transmitting, by the first screen host unit, a notification of shutting down screen display on the second screen device, to a second screen host unit corresponding to the second screen device; and
stopping, by the second screen host unit, transmission of screen display data to the second screen device.

14. A computer program product for multi-screen management, comprising a computer program that is executed by at least one processor for performing:
receiving a plurality of connection requests from a plurality of screen devices respectively;
creating a screen host unit corresponding to each screen device;
establishing a connection of each screen host unit to a corresponding screen device;
transmitting, by at least one screen host unit, screen display data to at least one corresponding screen device through at least one corresponding connection respectively;
receiving, by a first screen host unit, an indication of shutting down screen display on a second screen device, from a corresponding first screen device;
transmitting, by the first screen host unit, a notification of shutting down screen display on the second screen device, to a second screen host unit corresponding to the second screen device; and
stopping, by the second screen host unit, transmission of screen display data to the second screen device.

* * * * *